US006486882B1

United States Patent
Wolverton et al.

(10) Patent No.: US 6,486,882 B1
(45) Date of Patent: Nov. 26, 2002

(54) SYSTEM AND METHOD FOR DESIGNING COMPUTER GENERATED IMAGERY OF A TWO DIMENSIONAL ARRAY OF OBJECTS ADVANCING IN A THIRD DIMENSION

(75) Inventors: Jeff Wolverton, Los Angeles, CA (US); Paolo Costabel, Culver City, CA (US); Alan Lee Davidson, Marina Del Rey, CA (US); Francisco Xavier DeJesus, Marina Del Rey, CA (US); Brian Todd Steiner, Los Angeles, CA (US); Scott E Anderson, Marina Del Rey, CA (US); Allen Clifford Ruilova, Santa Monica, CA (US)

(73) Assignees: Sony Corporation, Tokyo (JP); Sony Pictures Entertainment, Culver City, CA (US)

( * ) Notice: Subject to any disclaimer, the term of this patent is extended or adjusted under 35 U.S.C. 154(b) by 29 days.

(21) Appl. No.: 09/620,963

(22) Filed: Jul. 21, 2000

(51) Int. Cl.⁷ .................................. G06T 15/00
(52) U.S. Cl. ................................ 345/475
(58) Field of Search .................. 345/473, 474, 345/475, 419, 420, 619, 620

(56) References Cited

U.S. PATENT DOCUMENTS 5,714,977 A * 2/1998 McNeil ................ 345/157
6,088,040 A * 7/2000 Oda et al. ............ 345/473

* cited by examiner

Primary Examiner—Phu K. Nguyen
(74) Attorney, Agent, or Firm—Haverstock & Owens LLP

(57) ABSTRACT

A process for generating animated images of a two-dimensional array of objects advancing in a third dimension includes the steps of: defining an array of objects; defining a start position, an end position, and an advancement path associated with each of the objects, each advancement path extending from the associated start position to the associated end position; defining an associated rate of advancement for each of the objects along the associated path; defining a manifold surface including a locus of points each being defined in a three dimensional coordinate system and having an associated height coordinate value, each of the objects being associated with one of the points on the manifold surface; determining an associated advancement start time for each of the objects based on the associated rate of advancement and an associated height coordinate value of an associated point on the manifold surface; and defining animated images of the array of objects advancing along the associated advancement paths in accordance with the associated rates of advancement and the associated advancement start times. The manifold surface provides an animator with a means for controlling a resulting animation in order to achieve a desired animated effect without the need to perform a cumbersome trial and error process.

30 Claims, 14 Drawing Sheets

SYSTEM AND METHOD FOR DESIGNING COMPUTER GENERATED IMAGERY OF A TWO DIMENSIONAL ARRAY OF OBJECTS ADVANCING IN A THIRD DIMENSION

BACKGROUND OF THE INVENTION

1. Field of the Invention

The present invention relates generally to the field of computer animation. More particularly, the present invention relates to a system and method for generating computer animated images of a two-dimensional array of objects advancing in a third dimension.

2. Description of the Prior Art

A common recurring problem in the field of computer animation is how to design and generate animated images of a two-dimensional array of objects advancing in a third dimension. The array of objects may be a regular or irregular array, and each of the objects of the array may be growing, gradually appearing, hurling through space, or propagating in any type of medium. As examples, the desired contents of an animation may include accelerated animated sequences depicting strands of hair growing on a human, patches of fur growing on an animal, blades of grass growing from the ground, a grove of trees growing in a forest, a hive of bees exiting a nest, icicles forming outwardly from a surface, crystals growing in a lattice, and spouts of water spraying from several sources. It is often desirable to depict the evolution of such processes in reverse such as for example in a sequence where the growth of hair is reversed. These are just a few examples of a wide variety of accelerated animated sequences depicting natural and organic types of processes which the animator must design to look natural.

As a more specific example, for various applications in the fields of medicine and medical training, it is often desirable to generate animated images depicting an accelerated growth of anatomical elements (e.g., bones, muscles, vascular tissue, organs, and other tissue) of a human or animal. Such animated images are also useful in special effects applications for motion pictures. In such applications, it may be desirable to provide a visual transformation from an invisible state to a visible state and vice-versa The subject matter of animated images of a two-dimensional array of objects advancing in a third dimension may also include animated sequences depicting unnatural or non-organic processes such as a hale of projectiles shot from a gallery of guns, or a matrix of light beams propagating from a plurality of sources. These are just a few examples of a wide variety of animated sequences depicting artificial processes which an animator may wish to design in order to achieve some particular desired effect.

In order to generate animated images of a two-dimensional array of objects advancing in a third dimension, it is necessary for an animator to first generate a model for the objects using primitives and attributes of the objects including their associated sizes and shapes, and also specifying paths of advancement of the objects in the third dimension including start positions and end positions. Subsequently, for each of the objects, the animator must specify animation attributes including a rate of advancement of the object as well as a start time specifying when the object will begin to advance along its associated path.

Various problems arise for the animator in generating models specifying attributes of the objects. However, these model generation problems are specific to the types of objects being modeled. For example, the generation of models for muscle fibers of a muscle structure is complicated by the fact that the muscle fibers must be substantially confined to the volume of the muscle structure which may change during the course of animation.

Animators face another problem, not specific to the types of objects being modeled, in designing the animation of a two-dimensional array of objects advancing in a third dimension. The problem in designing such animation attributes is that when the animator specifies rates of advancement for each associated object, as well as associated start times for advancement of each of the objects, the animator has no means by which to predict the overall look of the advancement of the objects. Typically, the animator must repetitively design the animation by defining the rates of advancement and the start times by hand and then view the resulting animated images in order to determine whether the animation appears natural or appears to have some other desired effect. For example, in the case of an organic growth process, the animator must design the rate of advancement and the start time for each object and then view the resulting animated images in accordance with a cumbersome trial and error process in order to achieve a desired appearance of organic growth.

What is needed is a system and method for generating realistic animated images of a two-dimensional array of objects advancing in a third dimension wherein the animator is provided with a means for controlling the resulting animation in order to achieve a desired animation effect without the need to perform a cumbersome trial and error process.

SUMMARY OF THE INVENTION

It is an object of the present invention to provide a system and method for generating realistic animated images of a two-dimensional array of objects advancing in a third dimension wherein the animator is provided with a means for controlling the resulting animation in order to achieve a desired animated effect.

It is also an object of the present invention to provide a system and method for generating realistic animated images of a two-dimensional array of muscle fibers of a muscle structure as the muscle structure moves in accordance with an animated sequence.

Briefly, a presently preferred embodiment of the present invention provides a process for generating animated images of a two-dimensional array of objects advancing in a third dimension. The process includes the steps of: defining an array of objects; defining a start position, an end position, and an advancement path associated with each of the objects, each advancement path extending from the associated start position to the associated end position; defining an associated rate of advancement for each of the objects along the associated path; defining a manifold surface including a locus of points each being defined in a three dimensional coordinate system and having an associated height coordinate value, each of the objects being associated with one of the points on the manifold surface; determining an associated advancement start time for each of the objects based on an associated height coordinate value of an associated point on the manifold surface; and defining animated images of the array of objects advancing along the associated advancement paths in accordance with the associated rates of advancement and the associated advancement start times. Each of the objects has an associated identification value that is mapped to an associated point on the manifold surface, and the identification values are assigned to the associated objects in accordance with a noise function.

The step of defining an associated rate of advancement for each of the objects along the associated path further includes the steps of: defining an average duration attribute associated with the array of objects, the average duration attribute indicating an average time required for advancement of the objects from the start positions to the end positions along the advancement paths; defining an average duration variance attribute associated with the array of objects, the average duration variance attribute indicating a variance in the time required for each of the objects to advance from its start position to its end position along its associated advancement path; and defining the associated rate of advancement based on the average duration attribute and the average duration variance attribute using a noise function.

In one embodiment, the step of defining an array of objects includes defining a muscle structure including an array of fibers each being defined by at least one associated primitive describing the fiber. In this embodiment, the start position, end position, and advancement path associated with each of the fibers is defined by the associated primitive. Also in this embodiment, the step of defining animated images includes defining animated graphical images of portions of the fibers gradually appearing or disappearing along the associated primitive.

In one embodiment, the step of defining the manifold surface includes: defining a first mathematical relationship expressed as a function of a first predefined frequency value defining at least one set of local maxima points on the manifold surface; determining a second mathematical relationship expressed as a function of a second predefined frequency value that is lower than the first predefined frequency value; and clamping the first mathematical relationship based on the second mathematical relationship so that each of the local maxima points of the set has an associated height value that is substantially close to the height values of other ones of the set of local maxima points.

The step of defining a muscle structure further includes: generating a muscle surface having an array of control points configured to form an outer surface generally defining a muscle structure having an associated volume; specifying a desired fiber diameter value for each of the muscle fibers; and determining attributes of each of the primitives defining the associated muscle fibers based on the volume of the muscle structure and the desired fiber diameter value.

In one embodiment, the step of determining attributes of each of the primitives further includes: determining a maximum transverse cross-sectional area of the muscle structure, the area being bounded by a curve tracing the cross-sectional area on the outer surface; determining at least one scaled down continuous curve based on the boundary curve, the first scaled down continuous curve being concentric with the boundary curve; determining fiber center points along the scaled down continuous curve; and determining an actual fiber diameter value for each of a plurality of fibers to be defined along the scaled down continuous curve.

An important advantage of the process of the present system for generating realistic animated images of a two-dimensional array of objects advancing in a third dimension is that the manifold surface provides the animator with a means for controlling the resulting animation in order to achieve a desired animated effect without the need to perform a cumbersome trial and error process.

The foregoing and other objects, features, and advantages of the present invention will be apparent from the following detailed description of the preferred embodiment which makes reference to the several figures of the drawing.

IN THE DRAWING

Figure 4:
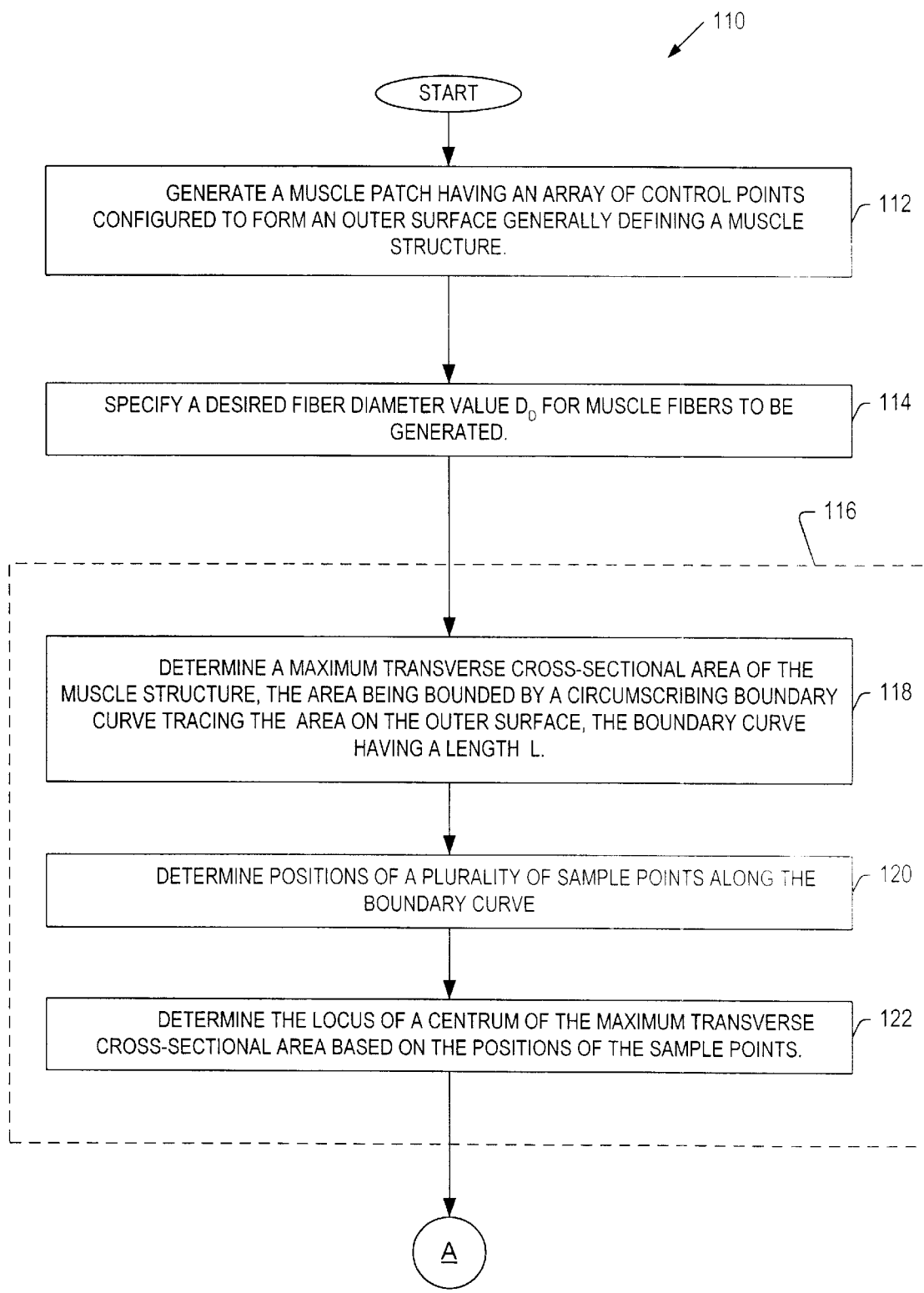
Figure 8:
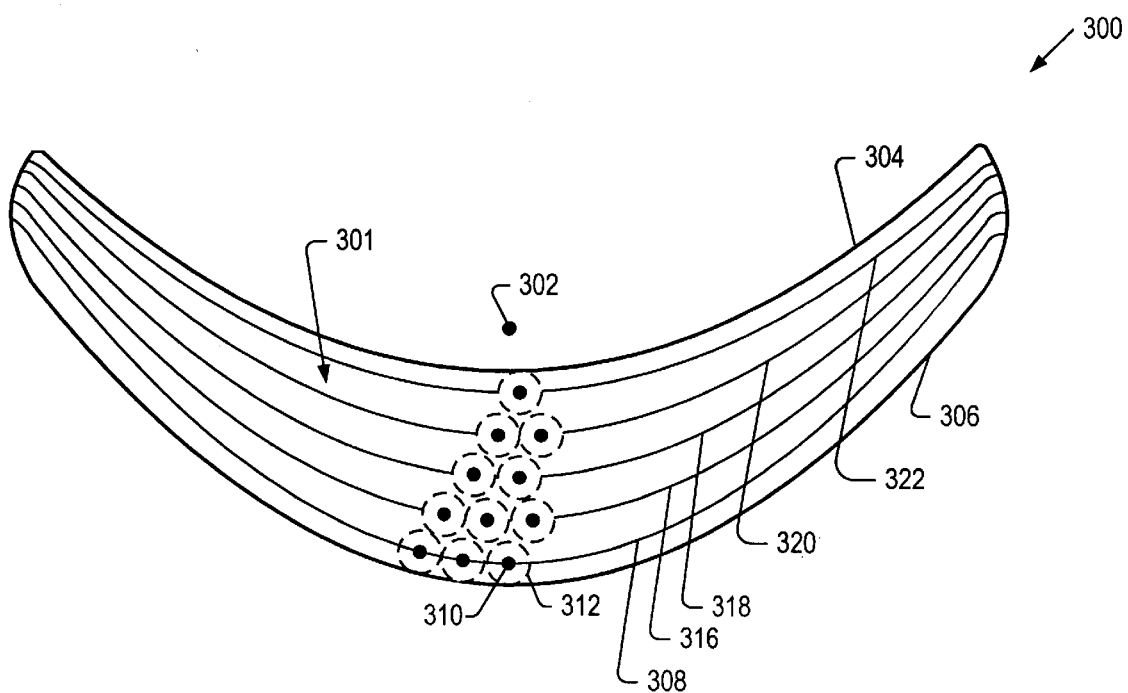
Figure 11:
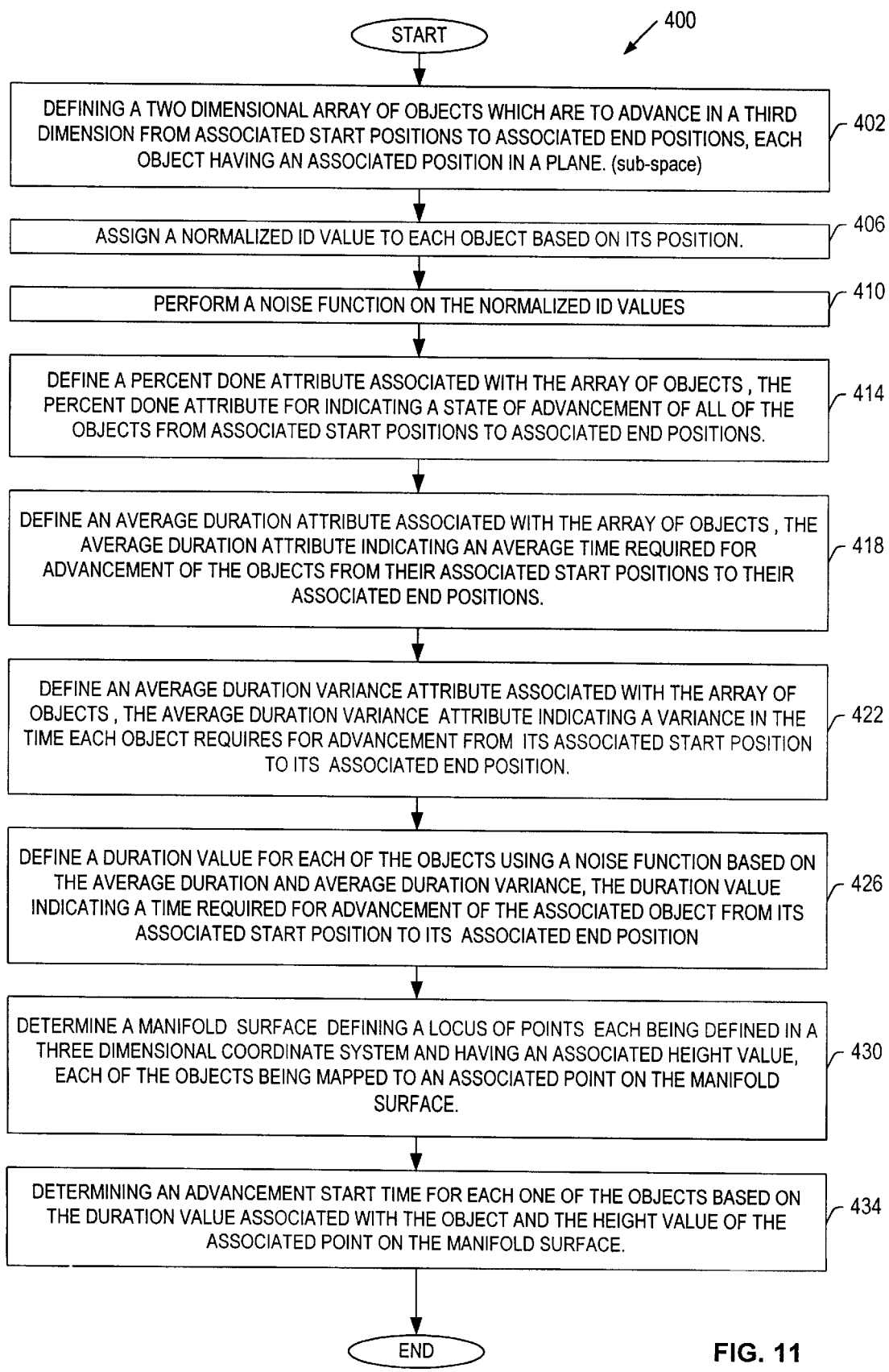
Figure 12:
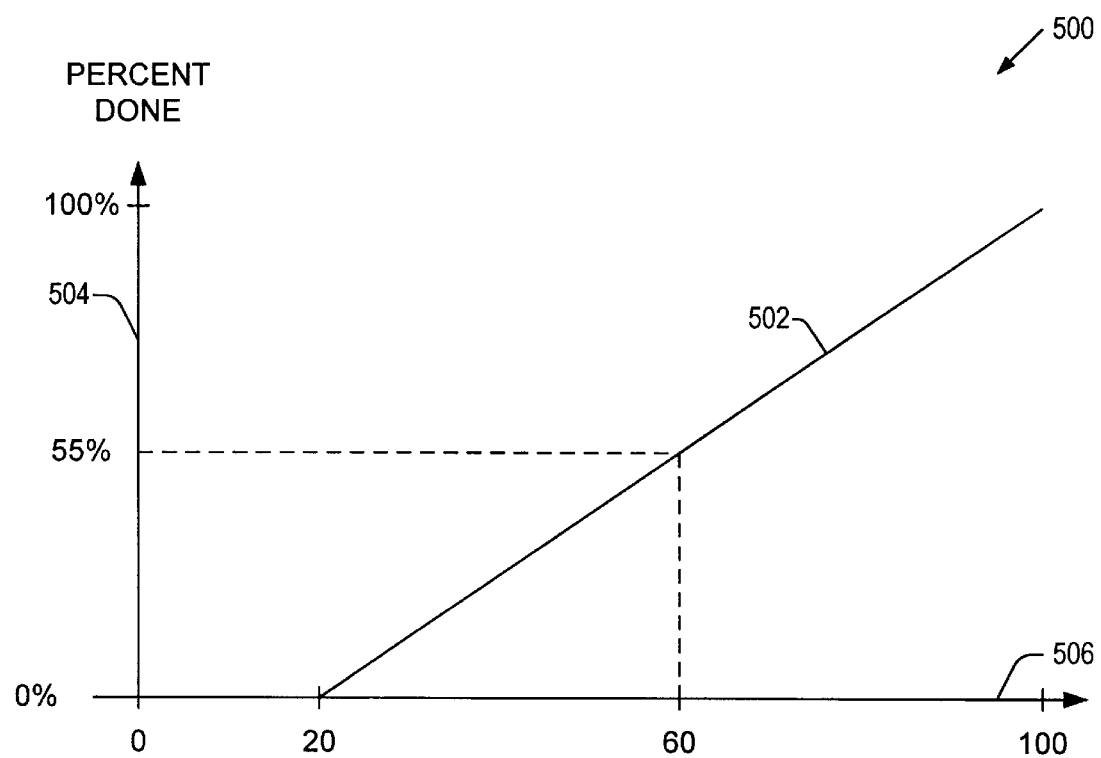

FIGS. 4 though 7 are flow diagrams illustrating the fiber generation process;

FIG. 8 is a transverse cross-sectional view of a special case type of muscle structure having a concave shaped transverse cross-section;

FIGS. 9A through 9D are perspective views illustrating a progressive growth of muscle fibers of a bicep muscle structure in accordance with an animation process of the present invention;

FIGS. 10A through 10D are perspective views illustrating a progressive growth of muscle fibers of arm muscles in accordance with an animation process of the present invention;

FIG. 11 is a flow diagram illustrating the process for generating animated images of a two-dimensional array of objects advancing in a third dimension in accordance with the present invention; and FIG. 12 is an animation graph illustrating a Percent Done attribute curve defining the values of a Percent Done animation attribute as a function of time or animation frames, the Percent Done curve being specified by an animator and used in accordance with the animation process of the present invention; and FIGS. 13A through 13F show perspective views of different types of manifold surfaces used for facilitating the design of animation attributes used in generating animated images of a two-dimensional array of objects advancing in a third dimension in accordance with the present invention.

DETAILED DESCRIPTION OF THE PREFERRED EMBODIMENT

Figure 1:
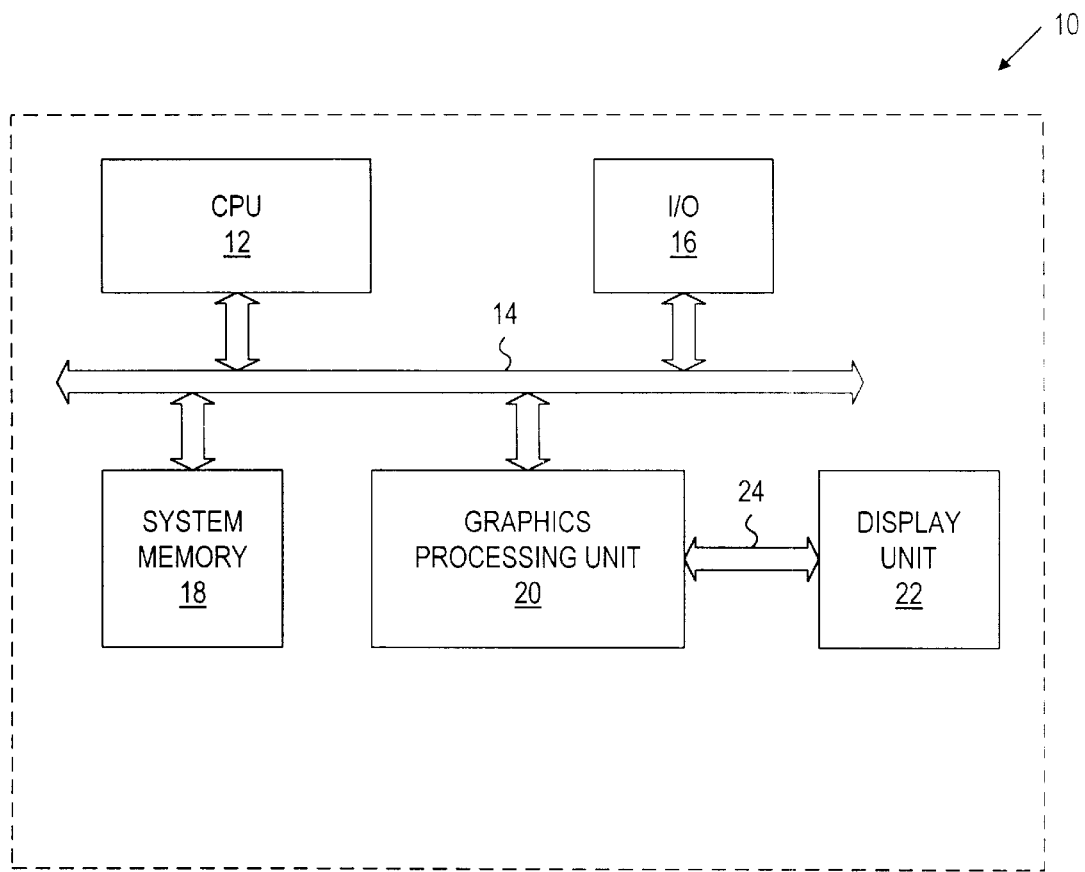
FIG. 1 is a generalized block diagram illustrating a computer graphics system that may be used to execute a process for generating computer animated images of a two-dimensional array of objects advancing in a third dimension in accordance with the present invention.

FIG. 1 shows a generalized block diagram illustrating a computer graphics system at 10 that may be used to execute a process for generating animated images of a two-dimensional array of objects advancing in a third dimension in accordance with the present invention as further explained below. The computer graphics system 10 generally includes:

a central processing unit (CPU) 12 communicatively coupled with a system bus 14; an input/output unit 16, a system memory unit 18, and a graphics processing unit 20 each being communicatively coupled with the CPU 12 via the system bus 14; and a display unit 22 communicatively coupled with the graphics processing unit 20 via an interface 24. In one embodiment, the system 10 is a computer graphics work station. In operation, the graphics processing unit 20 receives image display instructions and image data from clients such as the CPU via the system bus, and executes the instructions resulting in the generation of image data. The graphics processing unit 20 typically includes a 3D graphics pipeline (not shown) for generating data in the form of object descriptions. Object surfaces are formed by one or more primitives selected from different types including quadric surfaces, polygons, and parametric surfaces.

The process of the present invention may be used in conjunction with a 3D animation software tool executed by the computer graphics system 10. Examples of 3D animation software tools include Maya by Alias Wavefront which is a wholly owned subsidiary of Silicon Graphics, Inc., and RenderMan™ by Pixar. In one embodiment, important steps of the process of the present invention are implemented as a Maya plug-in, that is a software module compatible with Maya, comprising computer readable instructions for executing the process. In this embodiment, a graphics modeler may create animated images in accordance with the present invention using the Maya software tool package in conjunction with the plug-in of the present invention. However, it will be understood by those skilled in the art that the process may be implemented in any other software. Also, it will be understood that the process of the present invention can also be implemented using hardware logic modules adapted to execute the steps further described below.

Figure 2:
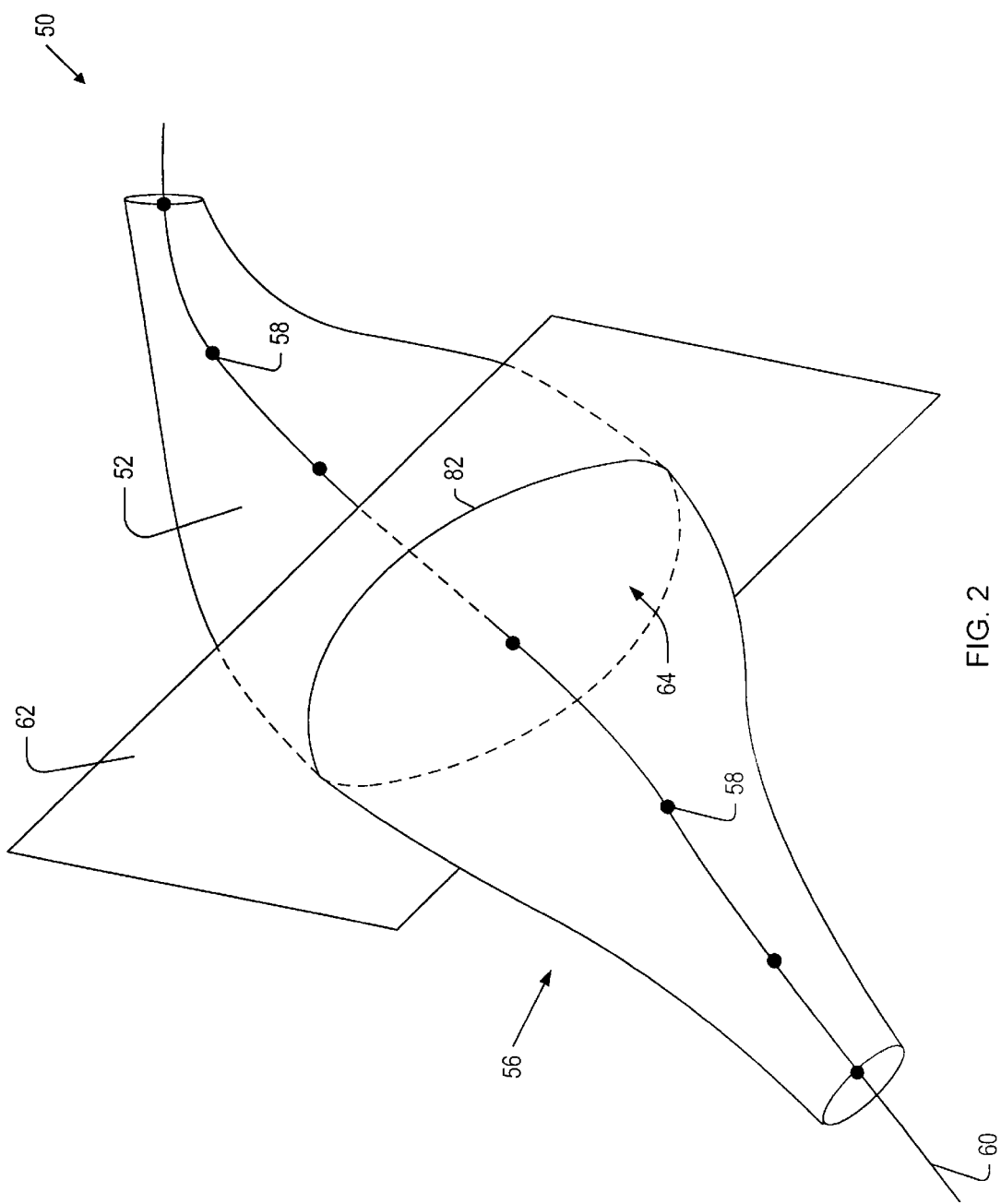
FIG. 2 is a perspective view of a muscle structure defined by a closed outer surface defining a volume to be optimally filled with muscle fibers having varying diameters in accordance with a fiber generation process of the present invention.

FIG. 2 shows a perspective view of a muscle structure at 50 defined by a closed outer surface 52 defining a volume to be optimally filled with muscle fibers having varying diameters in accordance with a fiber generation process of the present invention as further explained below. In one embodiment, the muscle structure 50 is defined by a non-uniform rational B-spline (NURBS) patch at 56 having a plurality of control vertex (CV) points 58. As shown, the CV points 58, which provide a control hull, are configured to form the closed surface 52 of the muscle structure 50. The surface 52 of the patch 50 is closed along a longitudinal axis 60 of the muscle structure 50.

As further explained below, the fiber generation process for filling the volume of the muscle structure with fibers includes a step of determining a maximum transverse cross-sectional area of the muscle structure 50. A transverse plane 62 is orthogonal to the longitudinal axis 60 of the muscle structure 50 at a point along the longitudinal axis where the muscle structure 50 has a maximum transverse cross-sectional area 64.

Figure 3A:
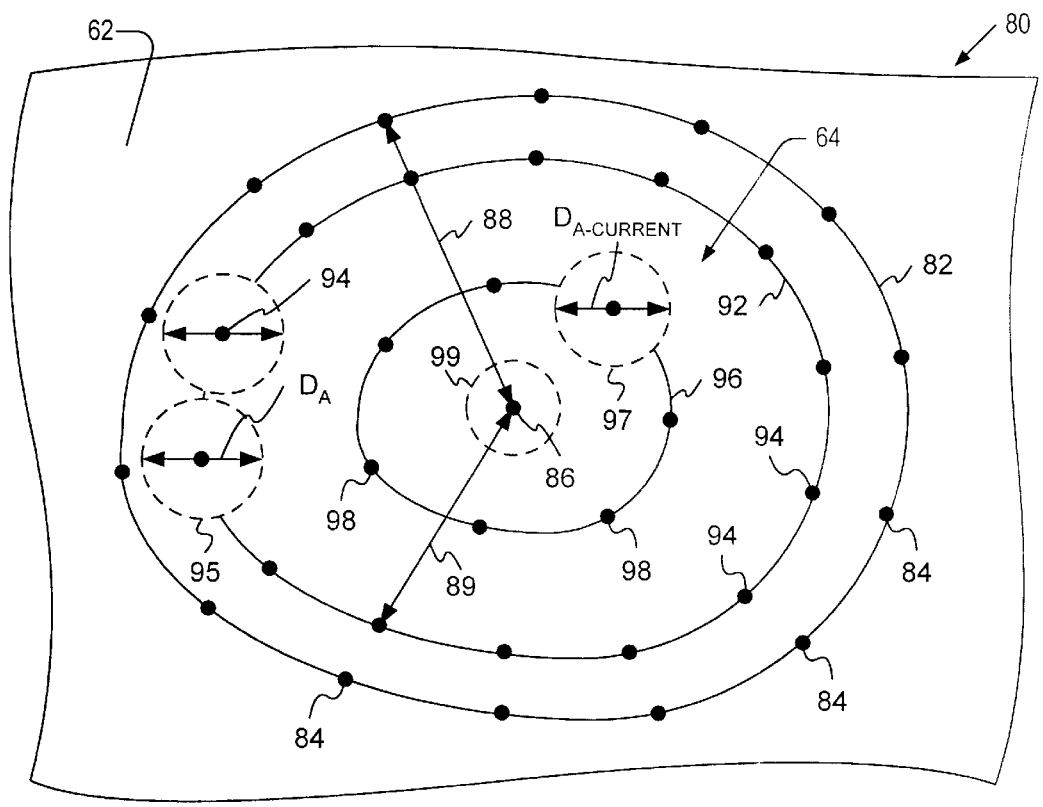
FIG. 3A is a transverse cross-sectional view of the muscle structure of FIG. 2 taken along a particular cross-section, the view showing calculated fiber center points for cross-sectional areas of fibers to fill the volume of the muscle structure.

FIG. 3A shows a transverse cross-sectional view at 80 of the muscle structure 50 (FIG. 2) taken along the plane 62 (FIG. 2). The cross-sectional area 64 of the muscle structure is bounded by a maximum circumscribing boundary curve 82 tracing the cross-sectional area 64 along the outer surface 52 (FIG. 2) of the muscle structure. The boundary curve 82 has a length, L.

As further explained below, the fiber generation process for filling the volume of the muscle structure 50 (FIG. 2) with muscle fibers generally includes: determining the positions of a plurality of sample points 84 along the boundary curve 82; determining the locus of a centrum 86 of the cross-sectional area 64 based on the positions of the sample points 84; determining a first scaled down continuous curve 92 associated with the maximum transverse cross-sectional area based on the boundary curve 82, the first scaled down continuous curve 92 being concentric with the boundary curve 82 and having a first scaled down curve length, the first scaled down continuous curve being scaled down by half of a desired fiber diameter value; determining an actual fiber diameter value $D_A$ for fibers to be defined along the first scaled down continuous curve 92; and determining positions of a calculated number of fiber center points 94 along the curve 92. In the described embodiment, the first set of muscle fibers 95 is modeled along the curve 92 which is scaled down by half of the desired fiber diameter value $D_D$ so that the muscle fibers are positioned substantially within the boundary curve 82. However, in an alternative embodiment, the muscle fibers could be positioned so that portions of the fibers extend beyond the boundary curve 82. In the embodiment wherein the muscle structure 50 (FIG. 2) is defined by a NURBS surface, the boundary curve and scaled down continuous curves are isoparms.

The fiber generation process for filling the volume of the muscle structure 50 (FIG. 2) with muscle fibers further includes determining a scaling factor which is used to calculate additional scaled down continuous curves. More specifically, the process further includes an iterative sub-process including the generalized steps of: determining a current scaled down continuous curve 96 based on the boundary curve 82, the locus of the centrum 86, and the scaling factor S, wherein the curve 96 is concentric with the boundary curve 82; determining an actual fiber diameter value $D_{A\text{-}CURRENT}$ for fibers to be defined along the curve 96; and determining positions of a calculated number of fiber center points 98 along the curve 96, the fiber center points 98 defining center points of muscle fiber cross-sectional areas 97. The process further includes a step of defining a central muscle fiber cross-sectional area 99 having a center point which coincides with the centrum 86.

Figure 3B:
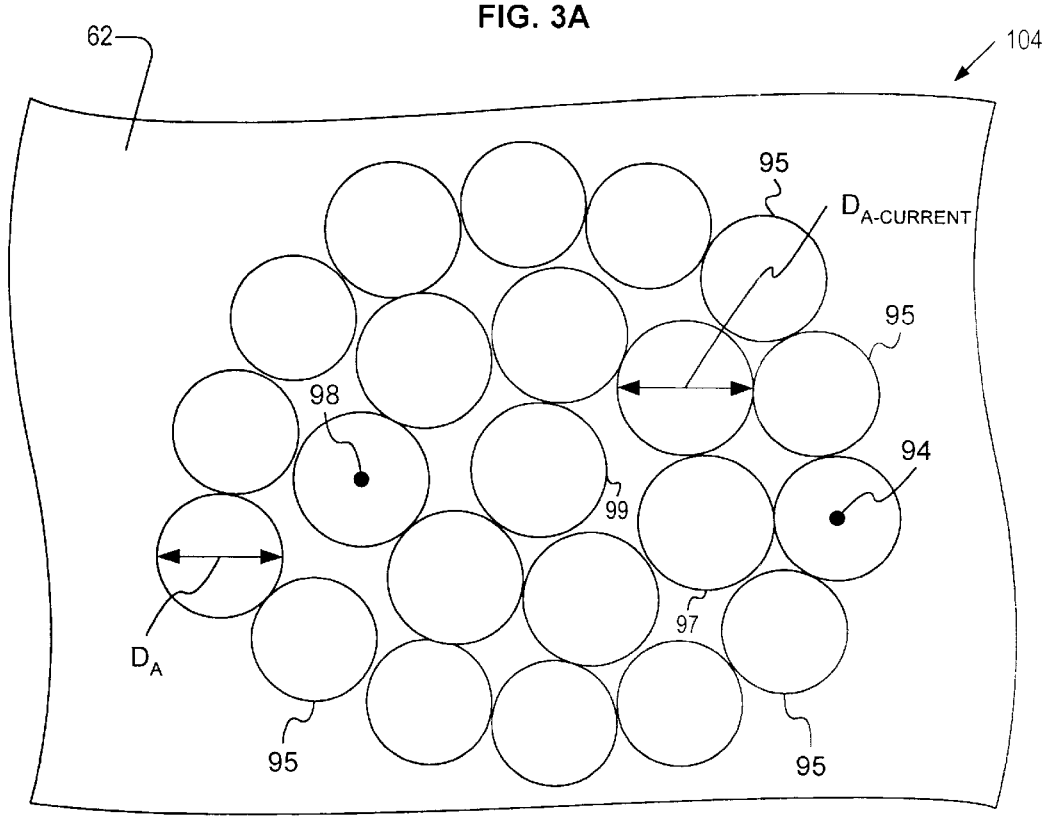
FIG. 3B is a second transverse cross-sectional view of the muscle structure wherein cross-sectional areas of muscle fibers are defined for the particular cross-section of the muscle structure in accordance with the fiber generation process.

FIG. 3B shows a second transverse cross-sectional view at 104 of the muscle structure. The diagram shows: the muscle fiber cross-sectional areas 95 having associated center points 94 along the curve 92 (FIG. 3A); muscle fiber cross-sectional areas 97 having associated center points 98 along the scaled down curve 96 (FIG. 3A); and the cross-sectional area 99 of the center fiber. The fiber generation process is further explained below with reference to flow diagrams.

Figure 3C:
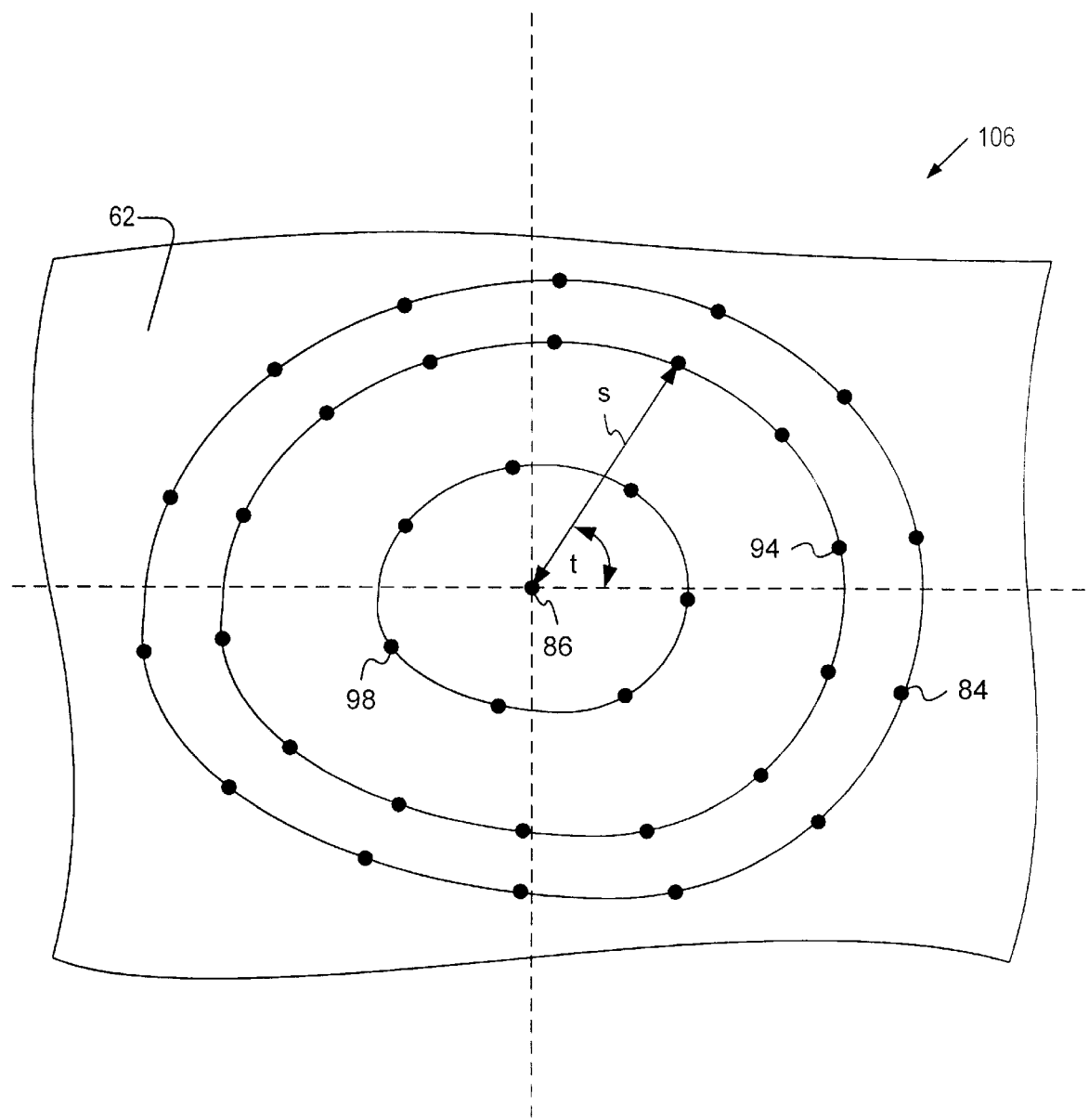
FIG. 3C is a third transverse cross-sectional view of the muscle structure showing a polar coordinate system used for defining the fiber center points for the muscle fibers.

FIG. 3C shows a third transverse cross-sectional view at 106 of the muscle structure illustrating a polar coordinate system used to define (s, t) polar coordinate values indicating the locus of each of the fiber center points. All points in a cross-sectional area of the muscle structure may be defined in the polar coordinate system using (s, t) coordinate values defined with reference to the centrum 86. The t coordinate value defines an angle, and the s coordinate value defines a radial distance between the centrum 86 and the associated point. In one embodiment, the (s, t) polar coordinate values are normalized.

FIG. 4 shows a flow diagram generally illustrating a fiber generation process at 110 for defining a muscle structure having a plurality of fibers. The process 110 is executed by a fiber generating system in accordance with the present invention which may be implemented as computer readable instructions stored in the system memory 18 and executed by a processor of the computer graphics system 10 (FIG. 1). The process 110 begins with a step 112 in which the fiber generating system defines a muscle patch 56 (FIG. 2) having an array of control points 58 (FIG. 2) configured to form an outer surface 52 generally defining a muscle structure 50 having a longitudinal axis 60 (FIG.2). In one embodiment, the definition of the muscle patch is input by a user. The muscle patch is defined by a parametric surface. In an embodiment, each of the anatomical patches is generated as a non-uniform rational B-spine surface (NURBS) patch having an associated array, or "hull", of control vertex (CV) points. In an alternative embodiment, each of the anatomical patches may be generated as a cubic Bezier patch or any other suitable type of parametric surface primitive. A NURBS patch, which is basically a tensile product of two B-spines, provides a modeler with a high degree of flexibility that is required for representing highly detailed curved bodies. The muscle NURBS patch may be defined using a software tool such as MAYA.

The muscle surface generating step 112 may include scanning a subject (such as a human being, a vertebrate animal, or any other structure) while the subject is in a rest pose. If the character is a person, the person's body is scanned while the person poses in a rest position with outstretched arms. Scanning the subject yields plain cloud data including a number of points defining a model of the subject. Based on the proportions of the scanned topology, a modeler may create models of muscle structures using the scanned topology.

In step 114, the system receives a user specified desired fiber diameter value $D_D$ for a muscle fiber. Note that in general, fiber diameters defined for each of a plurality of different muscles will be similarly sized, and small muscles will have fewer fibers than larger muscles. From step 114, the process 110 continues to execute a sub-process 116 which begins with a step 118 in which the system determines the maximum cross-sectional area 64 (FIG. 2) of the muscle structure, the area being bounded by the boundary curve 82 (FIG. 3A) which has a length L. In step 120, the system determines the positions of a plurality of sample points 84 along the boundary curve 82 (FIG. 3A). In step 122, the system determines the locus of a centrum 86 (FIG. 3A) of the cross-sectional area based on the positions of the sample points 84 (FIG. 3A). The locus of the centrum is determined by averaging the locations of each of the sample points. In one embodiment, all of the N sample points are defined using (x, y, z) world space coordinate values, and the centrum is defined in accordance with Relationship (1) below.

Centrum=$[(x_1+x_2+\ldots x_N)/N], [(y_1+y_2+\ldots y_N)/N], [(z_1+z_2+\ldots z_N)/N]$ (1)

After executing the sub-process 116, the process 110 proceeds to "A" (to FIG. 5) to execute further steps as explained below.

Figure 5:
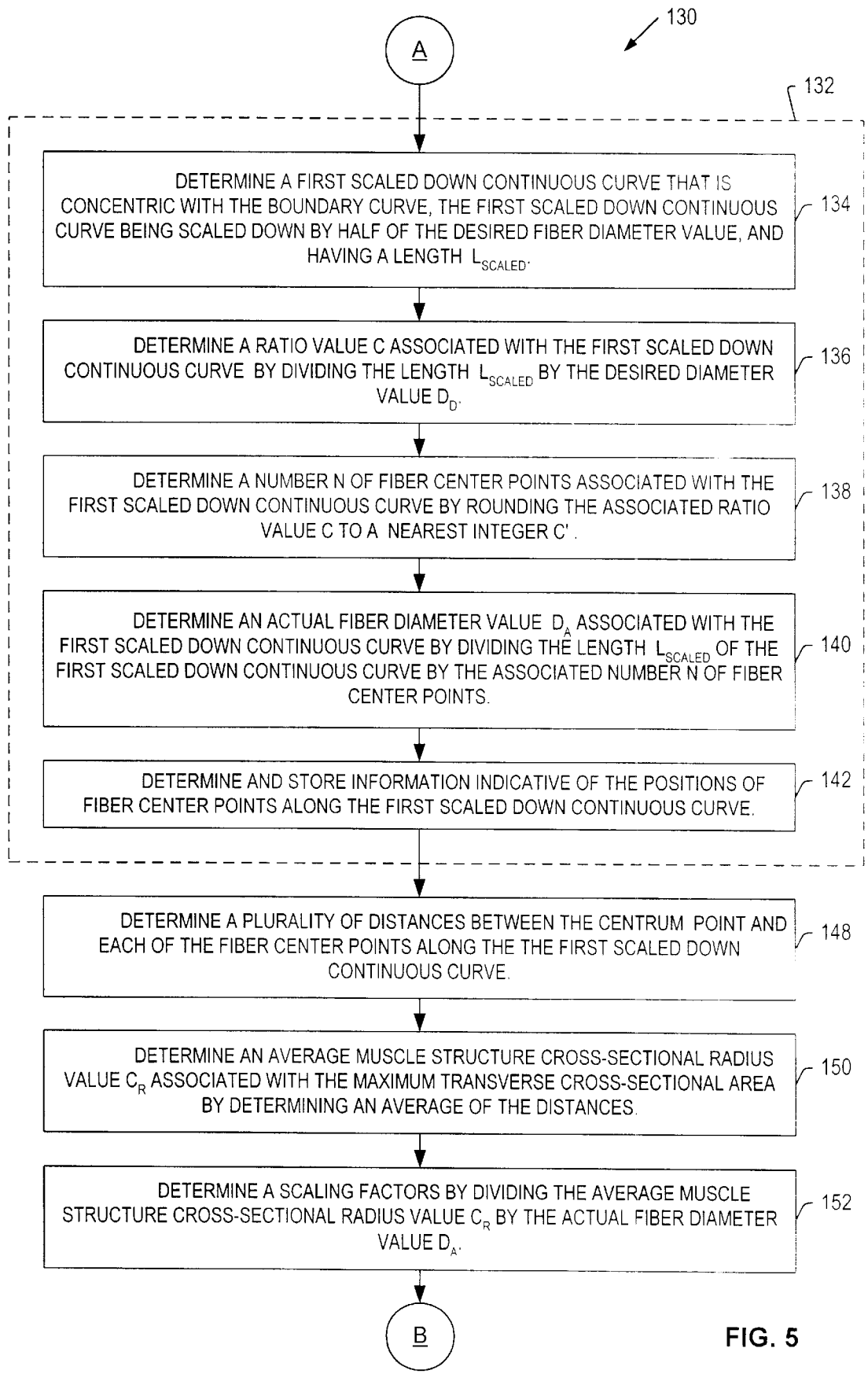

FIG. 5 shows a flow diagram generally illustrating further steps at 130 of the muscle fiber generation process. The process proceeds from "A" (from FIG. 4) to execute a sub-process 132 which begins with a step 134 in which the system determines a first scaled down curve 92 (FIG. 3A) based on the boundary curve 82, the scaled down curve being concentric with the boundary curve and having a length $L_{SCALED}$. Note that the first scaled down curve is scaled down by half of the desired fiber diameter value $D_D$. In step 136, the system determines a ratio value C associated with the curve 92 (FIG. 3A) by dividing its length $L_{SCALED}$ by the desired muscle fiber diameter value $D_D$. In step 138, the system determines a number N of fiber center points associated with the first scaled down continuous curve by rounding the associated ratio value C to a nearest integer C'=N. In step 140, the system determines an actual fiber diameter value $D_A$ (FIG. 3A) by dividing the length $L_{SCALED}$ by the associated number N of fiber center points. In step 142, the system determines and stores information indicative of positions of the fiber center points 94 (FIG. 3A) along the curve 92 (FIG. 3A).

After execution of the sub-process 132, the process proceeds to step 148 in which the system determines a plurality of distances $D_1, D_2, \ldots D_N$ shown at 89 (FIG. 3A) between the centrum 86 and each of the points 94 along the first scaled down curve. In step 150, the system determines an average muscle structure cross-sectional radius value $C_R$ associated with the area 64 (FIG. 5) by determining an average of the distances 89 (FIG. 3A). In one embodiment of the present invention, $C_R$ is defined in accordance with Relationship (2) below.

$C_R=(D_1+D_2+\ldots D_N)/N$ (2)

In step 152, the system determines a scaling factor S associated with the cross-sectional area 64 (FIG. 2) by dividing $C_R$ by the actual fiber diameter value $D_A$. After executing step 152, the process 110 proceeds to "B" (to FIG. 6) to execute further steps as explained below.

Figure 6:
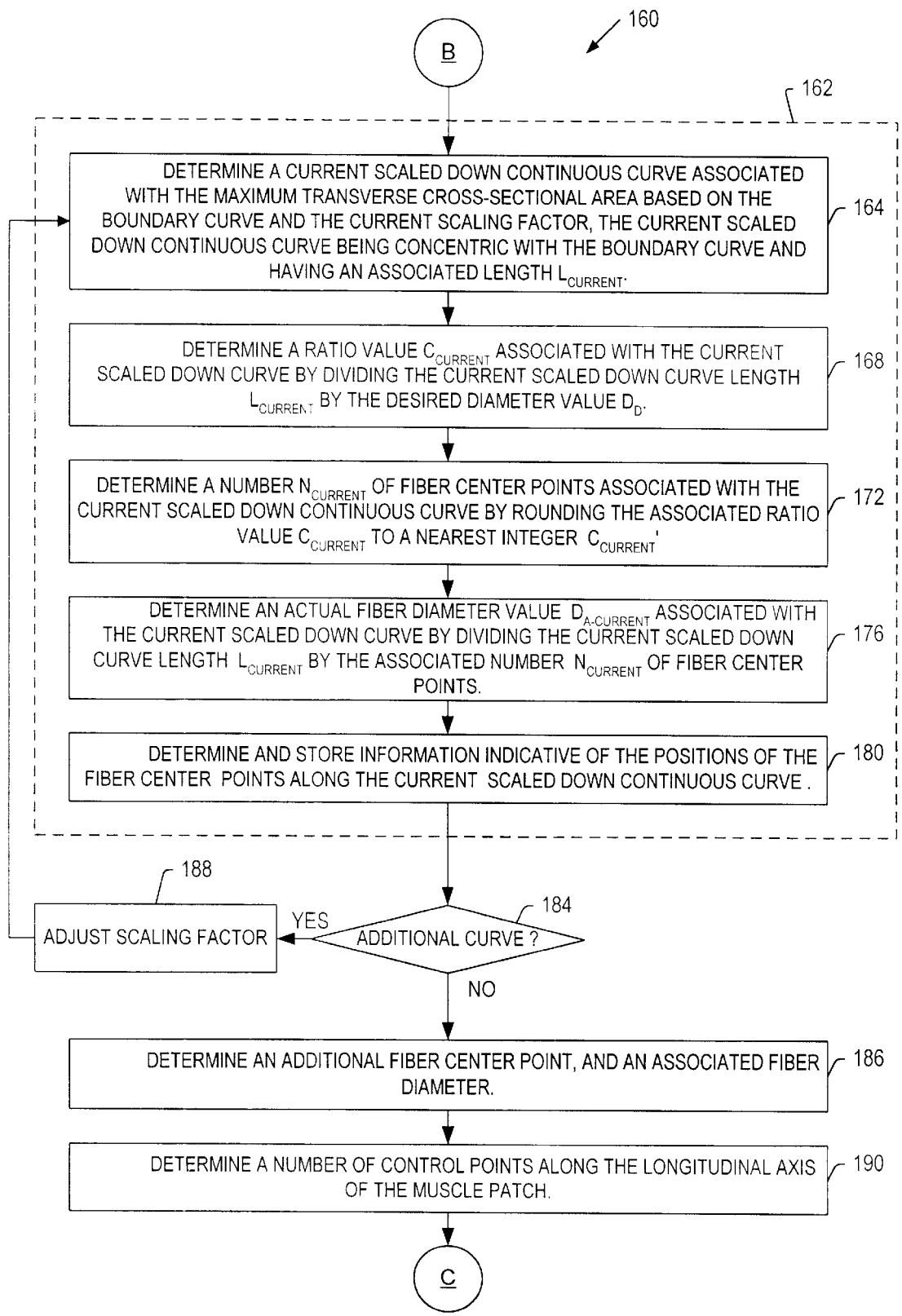

FIG. 6 shows a flow diagram generally illustrating further steps at 160 of the muscle fiber generation process. The process proceeds from "B" (from FIG. 5) to execute a sub-process 162 which begins with a step 164 in which the system determines a current scaled down continuous curve 96 (FIG. 3A) associated with the cross-sectional area 64 based on the boundary curve 82, the locus of the centrum 86, and the scaling factor S. The curve 96 is concentric with the boundary curve 82 and has a length $L_{CURRENT}$. In step 168, the system determines a current scaled down curve ratio value $C_{CURRENT}$ by dividing $L_{CURRENT}$ by the desired diameter value $D_D$. In step 172, a number $N_{CURRENT}$ of fiber center points associated with the current scaled down continuous curve is determined by rounding the value $C_{CURRENT}$ to a nearest integer value $C_{CURRENT}'$. In step 176, the system determines an actual fiber diameter value $D_{A-CURRENT}$ associated with the current scaled down curve by $L_{CURRENT}$ by $N_{CURRENT}$. In a preferred embodiment, a noise factor is added to each of the fiber diameter values in order to achieve a more natural visual effect. In one embodiment, the noise factor is generated in accordance with Perlin noise methods.

In step 180, the system determines and stores information indicative of the positions of the fiber center points 98 (FIG. 3A) along the current scaled down curve 96 by dividing $L_{CURRENT}$ by the fiber diameter value. In one embodiment, the positions of the fiber center points 98 (FIG. 3A) are determined using the polar coordinate system shown in FIG. 3C. Note that for each adjacent set of scaled down curves, an offset factor is used in determining the positions of the fiber center points thereby achieving a honeycomb spacing of fiber center points so that a maximum number of fibers may be defined within the volume of the muscle structure.

From step 180, the process proceeds to 184 at which it is determined whether there is an additional scaled down curve, and if so, the process proceeds to execute step 188 in which the scaling factor S is adjusted and then to execute the sub-process 162 again using the adjusted scaling factor to generate fiber center points along a next scaled down curve. If there is not an additional curve, the process proceeds to step 186 in which the system determines a fiber diameter value for a centralized fiber 99 (FIG. 3A).

From step 186, the process proceeds to step 190 in which the system determines the number of CV points 58 (FIG. 2)

along the longitudinal axis 60 (FIG. 2) of the muscle structure. In one embodiment, fiber center points are determined for a number of cross-sections equal to the number of CV points. From step 190, the process proceeds to "C" (to FIG. 7) to execute further steps.

Figure 7:
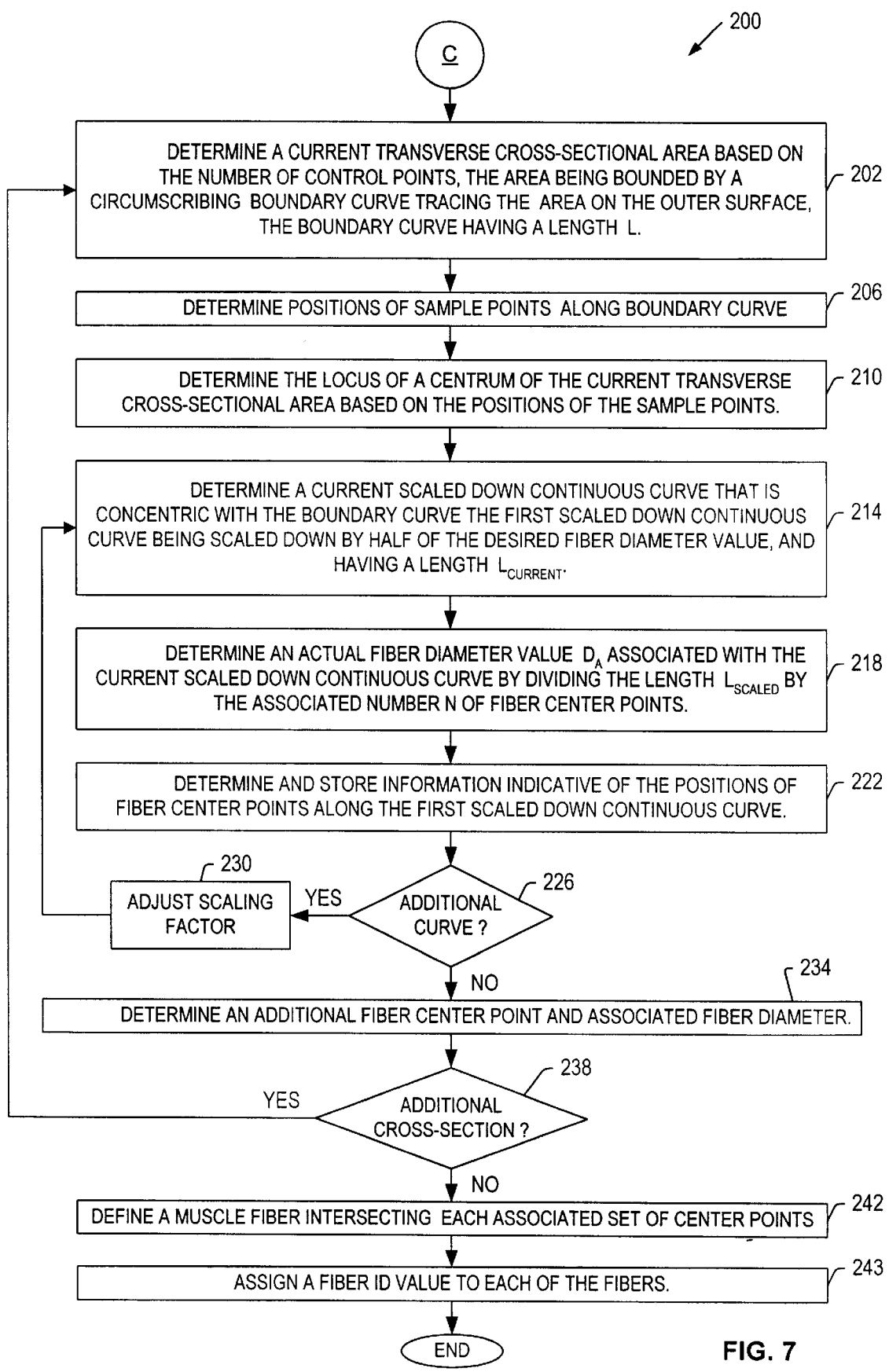

FIG. 7 shows a flow diagram generally illustrating further steps at 200 of the muscle fiber generation process 110 (FIG. 4). The process proceeds from "C" (from FIG. 6) to step 202 in which the system determines a next, or current transverse cross-sectional area of the muscle structure, the current area being bounded by an associated boundary curve having a length L. In step 206, the system determines the positions of a plurality of sample points along the boundary curve. In step 210, the locus of a centrum of the maximum transverse cross-sectional area is determined based on the positions of the sample points determined in step 206. Steps 202 through 210 are similar to steps 118–122 (FIG. 4) of the sub-process 116 for determining the maximum cross-sectional area 64 (FIG. 2) of the muscle structure and its centrum point.

Further steps of the process include determining muscle fiber center points along scaled down continuous curves in a manner similar to the steps described above for the cross-sectional area 64 (FIG. 2) except that it is not necessary to determine a number of continuous curves and a number of fibers along each curve because these numbers must be the same as for the maximum transverse cross-sectional area in order to ensure that each cross-sectional area includes the same number of fibers. Note that the diameters of the muscle fibers taper with the cross-sectional area of the muscle structure as further explained below.

From step 210, the process proceeds to step 214 in which the system determines a current scaled down curve 96 (FIG. 3A) associated with the current cross-sectional area based on the boundary curve, the locus of the associated centrum, and the scaling factor S. The current scaled down curve is concentric with the associated boundary curve and has a current scaled down curve length $L_{CURRENT}$. Note that each scaled down curve of each transverse cross-section is associated with one of the curves 92, 96 (FIG. 3A) defined in the maximum transverse cross-sectional area 64 (FIG. 3A). Note also that each set of continuous curves includes associated sets of fiber center points. A muscle fiber is to be defined to intersect each of the associated fiber points in the longitudinal direction of the muscle fiber.

In step 218, the system determines an actual fiber diameter value $D_A$ associated with the current scaled down curve by dividing the length $L_{CURRENT}$ by the associated number $N_{CURRENT}$ of fiber center points, wherein $N_{CURRENT}$ is determined by the number of fiber center points defined along the associated one of the continuous curves 92, 96 (FIG. 3A) defined in the maximum transverse cross-sectional area. In step 222, the fiber generating system determines and stores information indicative of the positions of fiber center points 98 (FIG. 3A) along the current curve in the current transverse cross-section by dividing the length $L_{CURRENT}$ by $D_A$. In one embodiment, the positions of the fiber center points are determined using the polar coordinate system shown in FIG. 3C.

From step 222, the process proceeds to step 226 at which it is determined whether there is an additional scaled down curve, and if so, the process proceeds to execute step 230 in which the scaling factor S is adjusted, and then proceeds to execute steps 214–222 again using the adjusted scaling factor to generate a next scaled down continuous curve and fiber center points along it. If there is not an additional scaled down curve, the process proceeds to step 234 in which the system determines a diameter of a central fiber. From step 234, the process proceeds to 238 at which it is determined whether there is an additional cross-sectional area (as determined by the number of CV points), and if so, the process repeats steps 202 through 234 for the next cross-sectional area. If there is not an additional cross-sectional area, the process proceeds to step 242 in which the system defmes a muscle fiber intersecting each of the associated sets of fiber points. In one embodiment, the muscle fibers are generated using Ri-cylinders which are quadric surface primitives generated using Renderman™ procedure calls.

In step 243, the system assigns a fiber ID value to each fiber so that fiber ID values are assigned in the order that the fibers are created. In an embodiment, each of the fiber ID values (ID values ranging from 0 to IDMAX which is the total number of fibers) is normalized (by dividing ID by IDMAX to generate a normalized ID value IDRA), in order to establish range of normalized ID values between 0 and 1.

FIG. 8 shows a transverse cross-sectional view of a "concave" muscle structure 300 having a concave shaped transverse cross-sectional area 301. Many different types of human and animal muscles have a concave shaped transverse cross-sectional area. Examples include trapezius muscles, and latissimus dorsi muscles. The fiber generation process 110 (FIG. 4) must be modified for "concave" muscle structures because a centrum 302 of the cross-sectional area 302 of the muscle structure 300 is located outside of the cross-sectional area 301. Therefore, the fiber generation process must be modified for concave muscles.

As shown in FIG. 8, a first isoparm 304 traces a first portion of the cross-sectional area 301, and a second isoparm 306 traces a second portion of the cross-sectional area. In accordance with a modified fiber generation process for concave muscles, the system sweeps a selected one of the isoparms, here the second isoparm 306, toward the first isoparm 304 across the cross-sectional area 301 of the concave muscle by duplicating and morphing replicated copies of the selected isoparm. Each replicated isoparm serves as a guide wire along which fiber center points may be defined. The replicated copies of the selected isoparm are scaled such that they are one fiber diameter distance apart. As in the above described fiber generation process 110 (FIG. 4), a first curve, here a first replicated isoparm 308, is scaled by half the desired diameter distance from the selected isoparm 306, and fiber center points 310 defining fiber cross-sectional areas 312 are defined along the first replicated isoparm 308. These steps are repeated for additional replicated isoparms 316–322.

Another class of muscles requiring a modified fiber generation process includes pennate and bi-pennate muscles. Most muscles in human body and animal bodies are fusiform muscles wherein fibers extend along the longitudinal axis of the muscle structure. But certain muscles (e.g., the human calf muscle and some other leg muscles) are pennate or bi-pennate muscles wherein the fibers do not extend along the longitudinal axis of the muscle structure. These muscles require a different fiber generation process. In these cases, explicitly generated and placed curve-on-surface curves indicating the direction of the fibers are placed and replicated to fill the muscle.

The direction in which the fibers advance during the animation process of appearing or disappearing, as further explained below, is controlled by various attributes (determining whether it goes forward in the muscle's U or V direction, or some combination). Note that fibers may also appear beginning at an arbitrary point on the muscle, instead of beginning at one of its ends. Rib muscles, that is interior and exterior costals, require special consideration due to their fiber directions being orthogonal to the direction of the muscles (similar to the pennate muscles) and the desired shape of their tips. Visual effects considerations require a "web-like" effect of the muscles between rib bones.

FIGS. 9A through 9D show perspective views illustrating a progressive growth of muscle fibers of a bicep muscle in accordance with an animation process of the present invention. Animated sequences similar to the one shown are generated in the motion picture "Hollow Man", produced by Sony Pictures Entertainment, wherein muscle structures and associated fibers are transformed from an invisible state to a visible state and vice-versa. In these animation sequences, it is desirable to provide a visual transition from one state of visibility to another without "fades" or "wipes".

Figure 9A:
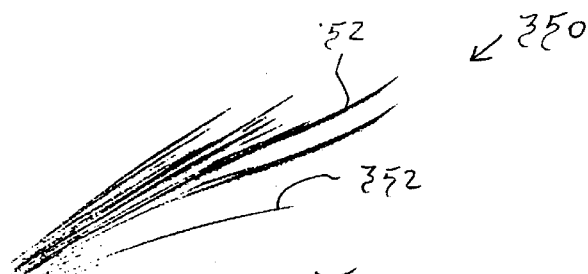
Figure 9B:
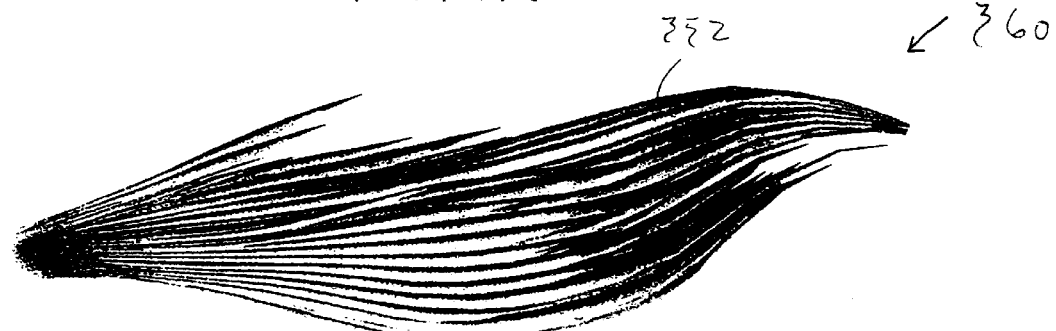
Figure 9C:
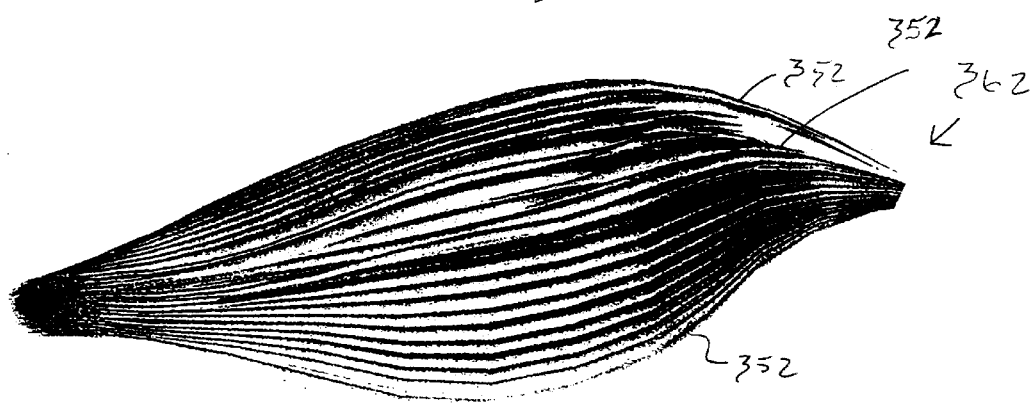
Figure 9D:
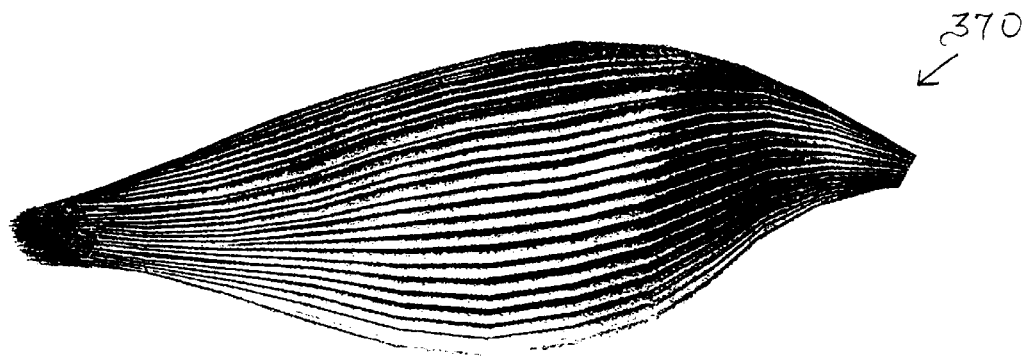
Figure 10A:
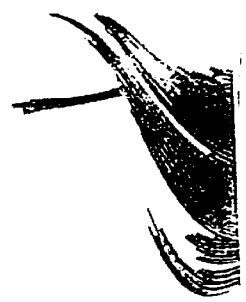
Figure 10B:
Figure 10C:
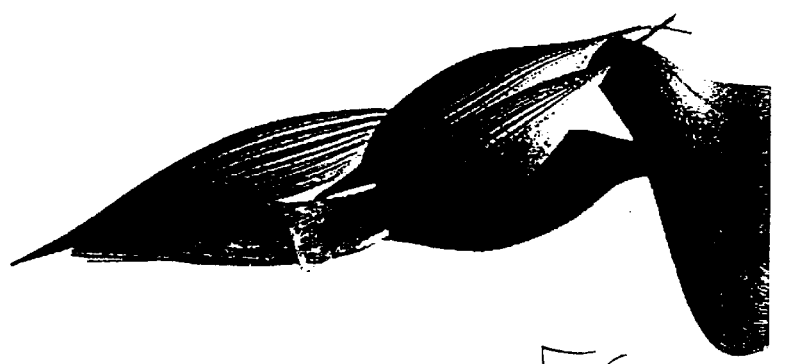
Figure 10D:
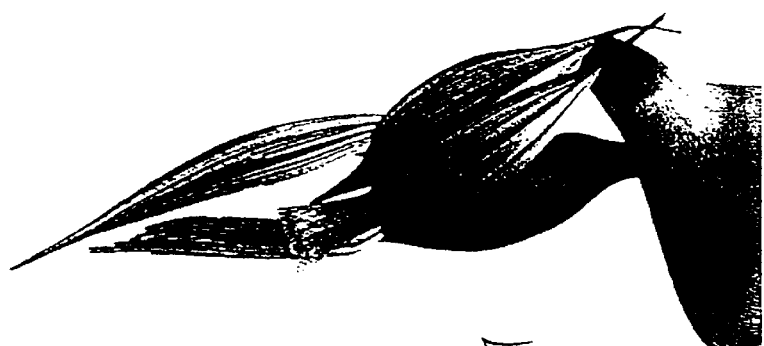

FIG. 9A shows an array at 350 of muscle fibers 352 as displayed in an early stage of an animation sequence wherein the muscle fibers 352 grow, or gradually appear. FIG. 9D shows a fully visible muscle structure at 370 having all muscle fibers 352 fully visible. Note that the muscle structure 370 is defined by the muscle surface 52 (FIG. 2), and geometric models for each of the fibers 352 are generated in accordance with the fiber generation process 110 (FIG. 4) which provides for specifying attributes of each of the fibers 352 including their associated sizes and shapes. As mentioned, the fibers 352 have cross-sectional areas which taper with the cross-sectional area of the muscle structure. The animation process receives animation attributes defined by a user including: a rate of advancement describing the growth, or gradual appearance, of each of the fibers 352; and a start time specifying when each particular one of the fibers 352 begins to advance along its associated path. Note that each of the attributes may be defined by a user in the form of an animation curve as further explained below. The fibers 352 do not begin to appear all at once, and the order in which the fibers begin to appear, or advance, may be controlled predictably by an animator using the animation process described below.

FIGS. 10A through 10D show perspective views illustrating a progressive growth of muscle fibers of arm muscles in accordance with the animation process of the present invention.

FIG. 11 shows a flow diagram generally illustrating an animation process at 400 for generating animated images of a two-dimensional array of objects advancing in a third dimension. The animation process 400 may be used to generate animated images of a wide variety of different types of objects including strands of hair growing on a human, patches of fur growing on an animal, blades of grass growing from the ground, a grove of trees growing in a forest, a hive of bees exiting a nest, icicles forming outwardly from a surface, crystals growing in a lattice, and spouts of water spraying from several sources. In one embodiment, the two-dimensional array of objects is an array of muscle fibers 352 having attributed generated in accordance with the fiber generation process described above (FIGS. 9A through 9D). Note that the attributes of other types of objects, such as those described above, may be generated in accordance with any type of object generation process known to those skilled in the art.

The process 400 is executed by an animation system in accordance with the present invention which may be implemented as computer readable instructions stored in the system memory 18 and executed by a processor of the computer graphics system 10 (FIG. 1). In the course of the animation process 400, animation attributes are specified for each of the objects. The animation attributes define animation characteristics including a rate of advancement of each object as well as a start time specifying when the object will begin to advance along its associated path.

The animation process 400 begins with a step 402 in which the animation system defines an array of objects which are to advance in a third dimension. The two dimensional array of objects is not actually be limited to an array lying in a plane as the start positions of the objects need not all be in the same plane. Also, the array may be a regular array or an irregular array.

In one embodiment, the array of objects is an array of muscle fibers 352 (FIGS. 9A through 9D) each having fiber generation attributes describing the geometry of each of the fibers including the actual diameters, and fiber center points generated in accordance with the fiber generation process. The muscle fibers are displayed in an animated sequence wherein each of the muscle fibers gradually appear or disappear in order to generate a visual effect of fibers growing in either a forward or a reverse direction. In this embodiment, the geometric descriptions of the muscle fibers define the path of advancement. As mentioned above, each fiber is defined by at least one associated primitive (e.g., a Ri-cylinder generated using Renderman™ procedure calls) describing the associated fiber. In this embodiment, the start position, end position, and advancement path associated with each of the fibers is defined its associated primitive, and the animated images show portions of each of the fibers gradually appearing or disappearing along the associated primitive.

In step 406, the animation system assigns a normalized ID value to each of the objects based on its associated position within the array. In the muscle fiber animation embodiment, the normalized ID values are defined in step 243 (FIG. 7) of the fiber generation process. As described above, each of the fibers has an associated fiber ID value that is normalized to range between 0 and 1. In step 410, the system performs a noise function on the normalized fiber ID values thereby reassigning the fiber ID values in order to achieve a more organic looking animation effect.

In step 414, the animation system defines a Percent Done attribute associated with the whole array of objects, the Percent Done attribute indicating a state of advancement of all of the objects along the advancement paths. In the muscle fiber animation embodiment, the Percent Done attribute is used to indicate the state of visibility of all of the fibers 352 collectively of the entire muscle structure. When the Percent Done attribute has a value of zero, all of the fibers are completely invisible, or have not advanced beyond their associated start positions. When the Percent Done attribute has a value of 100, all of the fibers are completely visible, or have advanced completely to their associated end positions. Note that the only difference between fibers appearing and disappearing is the direction in which the Percent Done attribute changes. In the preferred embodiment, all animation attributes including the Percent Done attribute are defined by a user of the animation system, and may vary as a function of time or animation frames. Therefore, each of the animation attributes may be specified by the user as an animation curve wherein the attribute varies as a function of time (or animation frames) or as a function of another one of the attributes. As further explained below, several of the animation attributes used in the process of the present invention are expressed as a function of Percent Done values for the purpose of providing the user with flexibility.

With reference to FIG. 12, an animation graph at 500 illustrates a Percent Done curve 502 defining values of the Percent Done animation attribute as shown along an axis 504 as a function of time (or frames) as expressed along an axis 506. Note that the Percent Done values along the axis 506, ranging from 0 Percent Done to 100 Percent Done, indicate a percentage of the total amount of time required for all objects of the array (e.g., all fibers of the muscle structure) to advance to their end positions. The Percent Done curve 502 may be specified by an animator. In the depicted example, the Percent Done curve 502 has a zero Percent Done value between 0 frames and 20 frames, and increases linearly from 0% to 100% between 20 frames and 100 frames. In one embodiment, the Percent Done curve 502 is specified by the animator who is a user of the animation system.

With reference back to FIG. 11, an Average Duration attribute associated with the whole array of objects is defined in step 418. In one embodiment, the Average Duration attribute is defined by the user and received by the system as input. The Average Duration attribute indicates an average time required for advancement of each of the objects to their end positions. In one embodiment, the Average Duration attribute is expressed as a percentage of the total Percent Done value (Percent Done=100) required for all of the objects of the array to advance to their end positions. In the muscle fiber animation embodiment, the Average Duration attribute is expressed as a percentage of the total Percent Done value required for all of the muscle fibers to transform from completely invisible to completely visible or vice versa.

Note that two muscle structures having identical Percent Done curves may behave very differently based on their associated Average Duration attributes. For a muscle structure having an associated Average Duration attribute of 100, each of the fibers 352 requires an amount of time defined by the full Percent Done value (Percent Done=100) to appear, resulting in all of the fibers advancing together. For a muscle structure having an associated Average Duration attribute of 25%, each of the fibers advance from their associated start positions to their associated end positions more quickly, appearing or disappearing in ¼th the time of the overall time it takes for the entire muscle to appear.

In step 422, an Average Duration Variance attribute associated with the array of objects is defined, the Average Duration variance attribute indicating a variance in the average duration each object requires for advancement to its end position. In one embodiment, the Average Duration Variance attribute is defined by the user and received by the system as input.

In step 426, a Duration value is defined for each of the objects using a noise function based on the Average Duration and Average Duration Variance attributes. The Duration value defined for each of the objects is also expressed as a function of Percent Done values (which are indicative of a time, or number of frames) required for advancement of the associated object to its associated end position. In the muscle fiber animation embodiment, if the Average Duration value is 50 and the Average Duration Variance is 10 for a muscle structure, then the range of Duration values varies from 40 to 60 and the animation system defines a duration value for each of the fibers using a noise function. If the duration value for a particular one of the fibers 352 (FIG. 9A) is 50, then the fiber must begin to advance between 0 Percent Done and 50 Percent Done. The Percent Done value at which the particular fiber actually begins to advance is determined using a manifold surface as further explained below. As explained above, a Percent Done value at which a particular fiber actually begins to advance may be used to determine an advancement start time.

Figures 13A, 13B, 13C:
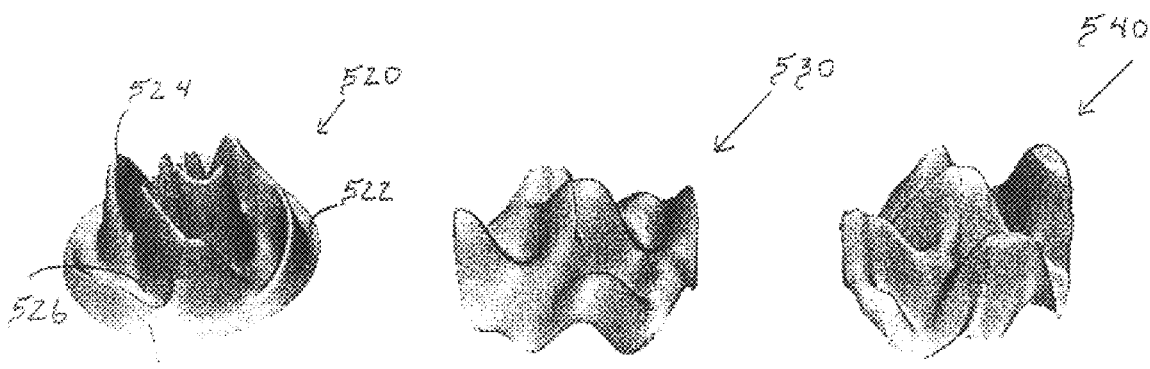

In step 430, a manifold surface including a locus of points is defined, each point each being defined in a three dimensional coordinate system and having an associated height value, each of the objects being mapped to an associated point on the manifold surface. With reference to FIG. 13A, a manifold surface at 520 defines a locus of points each being defined in a polar coordinate system (s, t, h) wherein the s and t coordinates correspond directly (or are mapped indirectly) to the (s, t) polar coordinate values defining the locus of each of the fiber center points 94 and 98 (FIG. 3C) in cross-sections of the muscle structure, and wherein the height coordinate value h for an associated (s, t) point is used to define an advancement start time for an associated muscle fiber that maps to the associated (s, t) point as further explained below. Note that the (s, t, h) polar coordinate values are normalized.

In step 434, the system determines an advancement Percent Done value, which is indicative of an advancement start time, for each of the objects based on the associated duration value and the height coordinate value h of the associated point on the manifold surface. For example, if the Duration value determined in step 426 for a particular fiber is 50, then the fiber must begin to advance within a time range defined between 0 Percent Done and 50 Percent Done. The Percent Done value at which the particular fiber actually begins to advance is determined based on the associated height coordinate value h of a point on the manifold surface. If the height coordinate value h of a point associated with the particular fiber is 0.5, then the Percent Done value at which the particular fiber actually begins to advance is defined by Relationship (3), below.

$$(1-h)*\text{range}=0.5*50=25 \tag{3}$$

As mentioned above, the Percent Done value at which a particular fiber actually begins to advance may be related to an advancement start time.

FIGS. 13A through 13F show perspective views of different types of manifold surfaces used in designing animation attributes of computer generated imagery of a two-dimensional array of objects advancing in a third dimension. The manifold surfaces provide an animator with a means for controlling the resulting animation in order to achieve a desired animated effect without the need to perform a cumbersome trial and error process.

FIG. 13A shows perspective view of a first exemplary manifold surface at 520. A point 522 along the outer edge of the manifold surface 520 has a low height value h=0, and a muscle fiber mapped to point 522 will begin to advance during a last possible Percent Done value. A point 524 located at a peak of the manifold surface 520 has a high height value h=1, and a fiber mapped to point 524 will begin to advance during first possible Percent Done value. A point 526 located at a "valley" of the manifold surface 520 has a height value h=0.

Viewing the topology of the manifold surface provides an animator with the ability to accurately predict a resulting animation of a two-dimensional array of objects advancing in a third dimension. Using the manifold surface 520 for the muscle fiber animation embodiment, the fibers on the outside of the muscles would begin to advance last providing a resulting animated image of the interior fibers transforming first, and a few transforming fibers would be covered up before they finished transforming. The low outer edges of the manifold 520 keep from covering up interesting details of the animation. For the muscle fiber animation embodiment wherein an organic looking growth scene is desired, the manifold surface 520 provides a somewhat robotic animation sequence which may be useful for other animated sequences.

FIG. 13B shows a perspective view of a second exemplary manifold surface at 530. Using the manifold surface 530 for the muscle fiber animation embodiment results in not enough fibers moving immediately (the manifold has very few points where the height coordinate value h=1.0, meaning that few fibers begin to advance at the beginning of the animation).

FIG. 13C shows a perspective view of a third exemplary manifold surface at 540. The manifold surface 540 provides peaks (local maxima areas) and valleys (local minima areas), and fibers associated with points along the outer edge of the surface 540 tend to begin to advance last although.

Figures 13D, 13E, 13F:
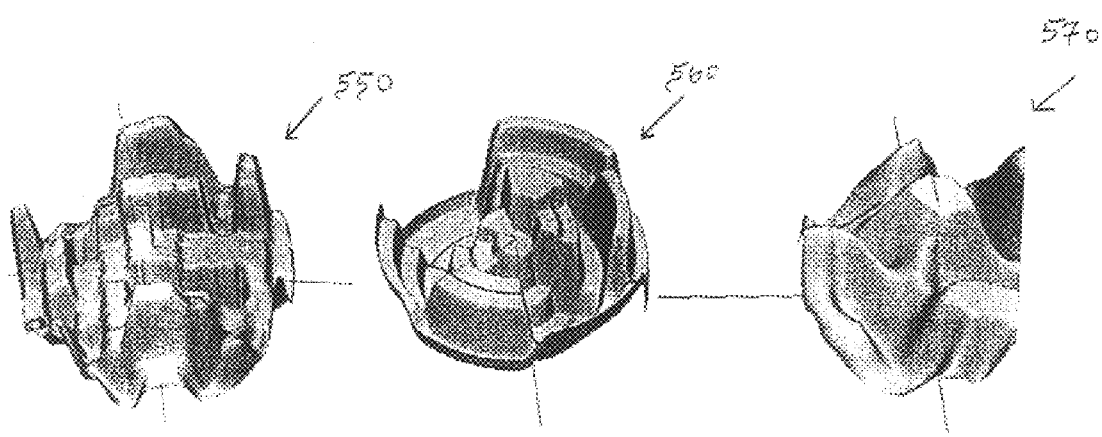

FIG. 13D shows a perspective view of a fourth exemplary manifold surface at 550. which is quantized cartesianally. FIG. 13E shows a perspective view of a fifth exemplary manifold surface at 560 which is quantized radially. Note that the cartesianal quantization was preferred by animators for generating animated images of muscle fibers appearing in the film "Hollow man". For these animated images, animators found it desirable that selected groups of the fibers 352 (FIG. 9A) begin to advance from substantially simultaneously instead of in a smooth segue. In order to achieve this effect, it was apparent to animators that a manifold having plateaus, that is areas where local maxima are flattened, is desirable. One method of mathematically flattening the local maxima of the manifold includes taking the second derivative of the equation describing the manifold surface. However, this is computationally prohibitive because the equation describing the manifold surface is a complex function involving noise functions. While derivatives could be approximated by sampling, it is easier to clamp the manifold surface 540 (FIG. 13C) to a lower frequency version of itself, resulting in the manifold surface at 570 of FIG. 13F. The manifold surface 570 was preferred by animators for controlling most of the muscle animation sequences in the film "Hollow Man".

The clamped manifold surface 570 provides an advantage of vaguely defined sections where the local maxima is clamped, and where groups of fibers tend to begin advancing at once. But in certain cases, it is desirable to exaggerate this effect to a maximum, that is to have all of the fibers advance as part of some discrete group. The option of quantizing the whole manifold provides for the muscle to appear in "chunks" thereby turning the entire manifold into a series of flat areas (FIG. 1D).

Specifically, given an attribute "Number Of chunks", it is possible to quantize the variables xra and yra (used in the above manifold code) using the below code.

```
float q=NumberOfChunks;
int is=xra*q;
xra=is/q;
int it=yra*q;
yra=it/q;
```

Finally, within a quanta, some small noise is added to IDRA.

For each fiber, a variable PRA is calculated, where PRA=0 indicates that the fiber is fully invisible, and PRA=1 indicates that the fiber is fully revealed. PRA is calculated based on the normalized fiber ID value IDRA. Initially, IDRA is modified to provide the animation, and then PRA is calculated from Average Duration and Percent Done by the following code.

```
float width=AvgDuration+[some noise];
float left=-width+(PercentDone/100)*(1+width);
PRA=(left+width-IDRA)/width;
```

PRA is then passed to a shader to determine a state of visibility, or opacity, of the fiber.

As mentioned above, IDRA is modified in step 410 (FIG. 11) before PRA is calculated. If IDRA were left unmodified, the fibers would simply reveal in the order they were created. This would produce a simple spiral pattern.

In order to provide controllable, organic, and interesting animation to IDRA, the three-dimensional manifold is determined in step 430. The height of this manifold is the prime factor in modifying the normalized fiber ID value IDRA.

The higher the frequency of the manifold (specified by the attribute Frequency, which is in turn modified by a noise scalar FrequencyNoise), the little "canyons" are seen as the muscle appears.

In accordance with the manifold surface 570 (FIG. 1F), the normalized fiber ID value IDRA is modified by the following code:

INPUT:
  tra: [0-1] float indicating the fibers location radially (around the muscle)
  sra: [0-1] float indicating the fiber's location centrally (0=on the outside, 1—in the center)

CODE:

```
float freqtra=Frequency;
float freqsra=Frequency;
float xra=sra*cos(6.28*tra);
float yra=sra*sin(6.28*tra);
[... ANY QUANTIZATION NEEDED IS PERFORMED HERE, THEN ...]
freqtra*=1+(FrequencyNoise-0.3)*noize(yra-xra);
freqsra*=1+(FrequencyNoise-0.3)*noize(xra+yra);
float xa=0.5+0.5*sin(freqsra*6.28*yra+FrequencyNoise*noize(yra));
float ya=0.5+0.5*sin(freqtra*6.28*xra+FrequencyNoise*noize(xra));
float inc=1.3-0.6*sra;
// This next line is the key—this is the three-dimensional manifold "Cap"
idra=(0.5*xa*sin(freqtra*6.28*xra*inc+FrequencyNoise*
noize(2*freqsra*yra))+0.5*ya*cos(freqsra*6.28*yra*inc+
FrequencyNoise*noize(2*freqtra*xra))+0.1*noize(tra+sra));
// Some more scaling to control idra
idra=0.5+0.5*idra;
idra*=0.8+0.2*pow(1-sra,0.5);
idra=idra-0.25*sin(6.28*idra);
```

In one embodiment, a simple slider (the attribute Percent Done) is used by the animators to control the overall reveal of the muscle. Additionally, it is useful to output a 2× and 3× fiber radius file because when the number of fibers became too large, shot setup options provide for rendering a scene with fibers that were twice as big (and hence tended to give ¼ the number of fibers). In other cases only certain "troublesome" muscles had their fiber size increased.

In one embodiment, the algorithm for generating and animating muscles fibers is implemented as two RenderMan DSOs, so that the fibers can be generated only at render time. This provides an advantage because only muscles that appear on screen have their fibers created. Fibers do not have to be generated and saved out, and when the camera pans way from a muscle, its fibers are no longer being created. So on a frame-by-frame basis, only the minimum number of fibers needed are generated.

In one embodiment of the present invention, attributes are animated in Maya, and timing curves are attached to the Percent Done attributes. Note that all of the attributes are animatable, but usually only Percent Done actually changes over the course of a scene.

In one embodiment, Mel scripts are used to output the attribute's values and keyframes to a text file. Also in an embodiment, a 2× and 3× radius file is automatically output (where all attributes were the same except the radius was larger) providing shot-setup options of quickly switching to a less memory-intensive version of the fibers. This is very useful in the case of very memory requirements of a large number of fibers (e.g., 100,000 fibers)

Animation of muscles (transabdominus, rectus abdominus et al) requires special consideration. Because these muscles are large, flat muscles, visual effects considerations required specific demands on exactly where and when fibers moved and the muscle appeared/disappeared. In accordance with a modified muscle animation process, the fibers were created from the same set of attributes, put were placed as a single sheet across the flat of the muscle. This sheet was then replicated several times (an environment variable specified how many) to give depth.

In one embodiment, the animation of the fibers is controlled by a black and white texture map, animated in Composer5. This allows for precisely specifying what areas of muscles are open and what areas have fibers, and how they move. Some noise may be added by a shader to provide high frequency variation.

In a preferred embodiment of the present invention, for purposes of conserving computing power and memory, the fiber generation process 110 (FIG. 4) is performed at render time so that muscle fibers need only be generated for muscle structures to be displayed on the display device.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process for generating animated images of a two-dimensional array of objects advancing in a third dimension, the process comprising the steps of:

defining an array of objects;

defining a start position, an end position, and an advancement path associated with each of said objects, each said advancement path extending from the associated start position to the associated end position;

defining a manifold surface including a locus of points each being defined in a three dimensional coordinate system and having an associated height coordinate value, each of said objects being associated with one of said points on said manifold surface;

determining an associated advancement start time for each of said objects based on an associated height coordinate value of an associated point on said manifold surface; and defining animated images of said array of objects advancing along said associated advancement paths in accordance with said associated rates of advancement and said associated start times.

2. A process as recited in claim 1 further comprising a step of defining an associated rate of advancement for each of said objects along said associated path, said step of defining an associated rate of advancement including the steps of:

determining an average duration attribute associated with said array of objects, said average duration attribute indicating an average time required for advancement of said objects from said associated start positions to said associated end positions along said associated advancement paths;

determining an average duration variance attribute associated with said array of objects, said average duration variance attribute indicating a variance in the time required for each of said objects to advance from said associated start position to said associated end position along said associated advancement path; and defining said associated rate of advancement based on said average duration attribute and said average duration variance attribute using a noise function.

3. A process as recited in claim 1 wherein said step of defining an array of objects includes defining a muscle structure including an array of fibers each being defined by at least one associated primitive describing the associated fiber, and wherein said start position, said end position, and said advancement path associated with each of said fibers is defined by said associated primitive, and wherein said step of defining animated images includes defining animated images of portions of said fibers gradually appearing or disappearing along said associated primitive.

4. A process as recited in claim 3 wherein said step of defining a muscle structure further comprises:

generating a muscle surface having an array of control points configured to form an outer surface generally defining a muscle structure having an associated volume;

specifying a desired fiber diameter value for each of said muscle fibers; and determining attributes of each of said primitives defining said associated muscle fibers based on said volume of said muscle structure and said desired fiber diameter value.

5. A process as recited in claim 4 wherein said step of determining attributes of each of said primitives further comprises:

determining a maximum transverse cross-sectional area of said muscle structure, said maximum transverse cross-sectional area being bounded by a maximum circumscribing boundary curve tracing said maximum transverse cross-sectional area on said outer surface, said boundary curve having a length;

determining at least one scaled down continuous curve based on said boundary curve, said first scaled down continuous curve being concentric with said boundary curve and having an associated length;

determining fiber center points along said scaled down continuous curve; and determining an actual fiber diameter value for each of a plurality of fibers to be defined along said scaled down continuous curve.

6. A process as recited in claim 4 wherein said outer surface defines a muscle structure having a substantially concave shaped transverse cross-section, and wherein step of determining attributes of each of said primitives further comprises:

determining a maximum transverse cross-sectional area of said muscle structure, said maximum transverse cross-sectional area being bounded by a maximum circumscribing boundary curve tracing said maximum transverse cross-sectional area on said outer surface;

determining a first isoparm tracing a first portion of said boundary curve;

determining a second isoparm tracing a second portion of said boundary curve;

duplicating and morphing a selected one of said first and second isoparms to generate a replicated isoparm;

determining fiber center points along said replicated isoparm; and determining an actual fiber diameter value for each of a plurality of fibers to be defined along said replicated isoparm.

7. A process as recited in claim 1 wherein said associated primitive is a Ri-cylinder.

8. A process as recited in claim 1 wherein each of said objects has an associated identification value that is mapped to an associated point on said manifold surface, and wherein said identification values are assigned to said associated objects in accordance with a noise function.

9. A process as recited in claim 1 wherein said manifold surface includes at least one set of local maxima points each having an associated height value that is substantially close to the height values of other ones of said set of local maxima points.

10. A process as recited in claim 1 wherein said step of defining said manifold surface includes:

defining a first mathematical relationship expressed as a function of a first predefined frequency value defining at least one set of local maxima points on said manifold surface;

determining a second mathematical relationship expressed as a function of a second predefined frequency value that is lower than said first predefined frequency value; and clamping said first mathematical relationship based on said second mathematical relationship so that each of said local maxima points of said set has an associated height value that is substantially close to the height values of other ones of said set of local maxima points.

11. A process as recited in claim 10 further comprising a step of quantizing said first mathematical relationship.

12. A machine readable storage device having stored therein encoding instructions for executing a process of generating animated images of a muscle structure comprising the steps of:

defining an array of objects;

defining a start position, an end position, and an advancement path associated with each of said objects, each said advancement path extending from the associated start position to the associated end position;

defining a manifold surface including a locus of points each being defined in a three dimensional coordinate system and having an associated height coordinate value, each of said objects being associated with one of said points on said manifold surface;

determining an associated advancement start time for each of said objects based on an associated height coordinate value of an associated point on said manifold surface; and defining animated images of said array of objects advancing along said associated advancement paths in accordance with said associated rates of advancement and said associated advancement start times.

13. A machine readable storage device as recited in claim 12 further comprising a step of defining an associated rate of advancement for each of said objects along said associated path, said step of defining an associated rate of advancement including the steps of:

determining an average duration attribute associated with said array of objects, said average duration attribute indicating an average time required for advancement of said objects from said associated start positions to said associated end positions along said associated advancement paths;

determining an average duration variance attribute associated with said array of objects, said average duration variance attribute indicating a variance in the time required for each of said objects to advance from said associated start position to said associated end position along said associated advancement path; and defining said associated rate of advancement based on said average duration attribute and said average duration variance attribute using a noise function.

14. A machine readable storage device as recited in claim 12 wherein said step of defining an array of objects includes defining a muscle structure including an array of fibers each being defined by at least one associated primitive describing the associated fiber, and wherein said start position, said end position, and said advancement path associated with each of said fibers is defined by said associated primitive, and wherein said step of defining animated images includes defining animated images of portions of said fibers gradually appearing or disappearing along said associated primitive.

15. A machine readable storage device as recited in claim 14 wherein said step of defining a muscle structure further comprises:

generating a muscle surface having an array of control points configured to form an outer surface generally defining a muscle structure having an associated volume;

specifying a desired fiber diameter value for each of said muscle fibers; and determining attributes of each of said primitives based on said volume of said muscle structure and said desired fiber diameter value.

16. A machine readable storage device as recited in claim 15 wherein said step of determining attributes of each of said primitives further comprises:

determining a maximum transverse cross-sectional area of said muscle structure, said maximum transverse cross-sectional area being bounded by a maximum circumscribing boundary curve tracing said maximum transverse cross-sectional area on said outer surface, said boundary curve having a length;

determining at least one scaled down continuous curve based on said boundary curve, said first scaled down continuous curve being concentric with said boundary curve and having an associated length;

determining fiber center points along said scaled down continuous curve; and determining an actual fiber diameter value for each of a plurality of fibers to be defined along said scaled down continuous curve.

17. A machine readable storage device as recited in claim 20 wherein said outer surface defines a muscle structure having a substantially concave shaped transverse cross-section, and wherein step of determining attributes of each of said primitives further comprises:

determining a maximum transverse cross-sectional area of said muscle structure, said maximum transverse cross-sectional area being bounded by a maximum circumscribing boundary curve tracing said maximum transverse cross-sectional area on said outer surface;

determining a first isoparm tracing a first portion of said boundary curve;

determining a second isoparm tracing a second portion of said boundary curve;

duplicating and morphing a selected one of said first and second isoparms to generate a replicated isoparm;

determining fiber center points along said replicated isoparm; and determining an actual fiber diameter value for each of a plurality of fibers to be defined along said replicated isoparm.

18. A machine readable storage device as recited in claim 12 wherein said associated primitive is a Ri-cylinder.

19. A machine readable storage device as recited in claim 12 wherein each of said objects has an associated identification value that is mapped to an associated point on said manifold surface, and wherein said identification values are assigned to said associated objects in accordance with a noise function.

20. A machine readable storage device as recited in claim 12 wherein said manifold surface includes at least one set of local maxima points each having an associated height value that is substantially close to the height values of other ones of said set of local maxima points.

21. A machine readable storage device as recited in claim 12 wherein said step of defining said manifold surface includes:

defining a first mathematical relationship expressed as a function of a first predefined frequency value defining at least one set of local maxima points on said manifold surface;

determining a second mathematical relationship expressed as a function of a second predefined frequency value that is lower than said first predefined frequency value; and clamping said first mathematical relationship based on said second mathematical relationship so that each of said local maxima points of said set has an associated height value that is substantially close to the height values of other ones of said set of local maxima points.

22. A machine readable storage device as recited in claim 21 further comprising a step of quantizing said first mathematical relationship.

23. A system for executing a process of generating animated images of a two-dimensional array of objects advancing in a third dimension, the system comprising:

means for defining an array of objects;

means for defining a start position, an end position, and an advancement path associated with each of said objects, each said advancement path extending from the associated start position to the associated end position;

means for defining a manifold surface including a locus of points each being defined in a three dimensional coordinate system and having an associated height coordinate value, each of said objects being associated with one of said points on said manifold surface;

means for determining an associated advancement start time for each of said objects based on an associated height coordinate value of an associated point on said manifold surface; and means for defining animated images of said array of objects advancing along said associated advancement paths in accordance with said associated rates of advancement and said associated advancement start times.

24. A system as recited in claim 23 further comprising means for defining an associated rate of advancement for each of said objects along said associated path, said means for defining an associated rate of advancement including:

means for determining an average duration attribute associated with said array of objects, said average duration attribute indicating an average time required for advancement of said objects from said associated start positions to said associated end positions along said associated advancement paths;

means for determining an average duration variance attribute associated with said array of objects, said average duration variance attribute indicating a variance in the time required for each of said objects to advance from said associated start position to said associated end position along said associated advancement path; and means for defining said associated rate of advancement based on said average duration attribute and said average duration variance attribute using a noise function.

25. A system as recited in claim 23 wherein said means for defining an array of objects includes means for defining a muscle structure including an array of fibers each being defined by at least one associated primitive describing the associated fiber, and wherein said start position, said end position, and said advancement path associated with each of said fibers is defined by said associated primitive, and wherein said means for defining animated images includes defining animated images of portions of said fibers gradually appearing or disappearing along said associated primitive.

26. A system as recited in claim 23 wherein said associated primitive is a Ri-cylinder.

27. A system as recited in claim 23 wherein each of said objects has an associated identification value that is mapped to an associated point on said manifold surface, and wherein said identification values are assigned to said associated objects in accordance with a noise function.

28. A system as recited in claim 23 wherein said manifold surface includes at least one set of local maxima points each having an associated height value that is substantially close to the height values of other ones of said set of local maxima points.

29. A system as recited in claim 23 wherein said means for defining said manifold surface includes:

means for defining a first mathematical relationship expressed as a function of a first predefined frequency value defining at least one set of local maxima points on said manifold surface;

means for determining a second mathematical relationship expressed as a function of a second predefined frequency value that is lower than said first predefined frequency value; and means for clamping said first mathematical relationship based on said second mathematical relationship so that each of said local maxima points of said set has an associated height value that is substantially close to the height values of other ones of said set of local maxima points.

30. A system as recited in claim 29 further comprising means for quantizing said first mathematical relationship.

* * * * *

UNITED STATES PATENT AND TRADEMARK OFFICE
CERTIFICATE OF CORRECTION

PATENT NO. : 6,486,882 B1
DATED : November 26, 2002
INVENTOR(S) : Jeff Wolverton et al.

It is certified that error appears in the above-identified patent and that said Letters Patent is hereby corrected as shown below:

Drawings,
Sheet 10 of 14, Fig. 9A, please replace "52" with -- 352 --.

Column 20,
Line 62, please replace "20" with -- 15 --.

Signed and Sealed this

Eighth Day of April, 2003

JAMES E. ROGAN
*Director of the United States Patent and Trademark Office*